United States Patent
Yoshida et al.

(10) Patent No.: US 10,038,507 B2
(45) Date of Patent: Jul. 31, 2018

(54) OPTICAL TRANSMISSION SYSTEM, PHASE COMPENSATION METHOD, AND OPTICAL RECEPTION APPARATUS

(71) Applicant: NIPPON TELEGRAPH AND TELEPHONE CORPORATION, Tokyo (JP)

(72) Inventors: Mitsuteru Yoshida, Yokosuka (JP); Etsushi Yamazaki, Yokosuka (JP); Seiji Okamoto, Yokosuka (JP); Hiroyuki Uzawa, Atsugi (JP); Kengo Horikoshi, Yokosuka (JP); Koichi Ishihara, Yokosuka (JP); Takayuki Kobayashi, Yokosuka (JP); Yoshiaki Kisaka, Yokosuka (JP); Masahito Tomizawa, Yokosuka (JP); Naoki Fujiwara, Atsugi (JP); Tomoyoshi Kataoka, Yokosuka (JP); Kazushige Yonenaga, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 315 days.

(21) Appl. No.: 14/766,635

(22) PCT Filed: Feb. 13, 2014

(86) PCT No.: PCT/JP2014/053279
§ 371 (c)(1),
(2) Date: Aug. 7, 2015

(87) PCT Pub. No.: WO2014/126132
PCT Pub. Date: Aug. 21, 2014

(65) Prior Publication Data
US 2015/0372766 A1  Dec. 24, 2015

(30) Foreign Application Priority Data
Feb. 13, 2013 (JP) ................................. 2013-025924

(51) Int. Cl.
*H04B 10/61* (2013.01)
*H04B 10/2507* (2013.01)
(Continued)

(52) U.S. Cl.
CPC ..... *H04B 10/6165* (2013.01); *H04B 10/2507* (2013.01); *H04B 10/516* (2013.01);
(Continued)

(58) Field of Classification Search
CPC ........... H04L 1/0045; H04L 2027/0067; H04L 4/0048
See application file for complete search history.

(56) References Cited

U.S. PATENT DOCUMENTS 7,277,517 B1 * 10/2007 Murphy .............. H04L 27/2662
375/371
9,667,458 B1 * 5/2017 Frank ....................... H04L 27/22
(Continued)

FOREIGN PATENT DOCUMENTS

CN        1198051 A      11/1998
CN        1492250 A      4/2004
(Continued)

OTHER PUBLICATIONS

"Between." Merriam-Webster.com. Accessed Dec. 18, 2017. https://www.merriam-webster.com/dictionary/between.*
(Continued)

*Primary Examiner* — David Payne
*Assistant Examiner* — Tanya Motsinger
(74) *Attorney, Agent, or Firm* — Harness, Dickey & Pierce, P.L.C.

(57) ABSTRACT

An increase in circuit scale is suppressed and a phase variation caused in a transmission path or the like is compensated for. An optical transmission system includes: a pilot symbol detection unit which detects a plurality of pilot symbols intermittently inserted into a received complex electric field signal that is obtained through coherent detection for a received optical signal; an error signal computation unit which calculates a complex electric field error signal indicating a phase variation at each pilot symbol based on the pilot symbols detected by the pilot symbol detection unit and a predetermined reference symbol; a compensation electric field signal generation unit which estimates a phase variation between the pilot symbols in the received complex electric field signal using filter processing based on the complex electric field error signal calculated by the error signal computation unit; and a phase noise compensation unit which performs phase compensation for the received complex electric field signal based on the phase variation between the pilot symbols estimated by the compensation electric field signal generation unit.

16 Claims, 26 Drawing Sheets

(51) Int. Cl.
  *H04L 27/38* (2006.01)
  *H04B 10/516* (2013.01)
  *H04J 14/06* (2006.01)
  *H04L 27/00* (2006.01)
(52) U.S. Cl.
  CPC ............ *H04B 10/61* (2013.01); *H04J 14/06* (2013.01); *H04L 27/38* (2013.01); *H04L 2027/0067* (2013.01); *H04L 2027/0095* (2013.01)

(56) References Cited

U.S. PATENT DOCUMENTS

| | | | | |
|---|---|---|---|---|
| 2003/0026371 | A1* | 2/2003 | Laroia | H04L 27/266 375/362 |
| 2003/0072255 | A1* | 4/2003 | Ma | H04B 7/022 370/208 |
| 2004/0174812 | A1* | 9/2004 | Murakami | H04B 1/707 370/215 |
| 2005/0286649 | A1* | 12/2005 | Redfern | H04L 27/2662 375/260 |
| 2007/0230601 | A1* | 10/2007 | Yim | H04L 5/0048 375/260 |
| 2008/0056305 | A1* | 3/2008 | Medvedev | H04L 1/0045 370/491 |
| 2008/0232518 | A1* | 9/2008 | Kim | H04L 27/261 375/345 |
| 2009/0257515 | A1* | 10/2009 | Chang | H04L 5/0007 375/260 |
| 2009/0317092 | A1* | 12/2009 | Nakashima | H04B 10/61 398/204 |
| 2010/0329683 | A1* | 12/2010 | Liu | H04B 10/2513 398/81 |
| 2011/0293042 | A1* | 12/2011 | Rosenhouse | H04L 25/0232 375/316 |
| 2012/0099864 | A1* | 4/2012 | Ishihara | H04B 3/06 398/65 |
| 2012/0154031 | A1* | 6/2012 | Zuckerman | H03L 7/185 327/551 |
| 2013/0089339 | A1* | 4/2013 | Liu | H04B 10/112 398/152 |
| 2015/0333838 | A1* | 11/2015 | Horikoshi | H04L 27/066 398/208 |
| 2015/0372766 | A1* | 12/2015 | Yoshida | H04B 10/2507 398/193 |
| 2016/0261351 | A1* | 9/2016 | Raybon | G02B 6/2861 |

FOREIGN PATENT DOCUMENTS

| | | |
|---|---|---|
| CN | 102263712 A | 11/2011 |
| JP | 03-071275 A | 3/1991 |
| JP | H11-127208 A | 5/1999 |
| JP | 2000-134176 A | 5/2000 |
| JP | 2002-217862 A | 8/2002 |
| JP | 2005-012794 A | 1/2005 |
| JP | 2005-124125 A | 5/2005 |
| JP | 2008-177807 A | 7/2008 |
| JP | 2009-141897 A | 6/2009 |
| JP | 2009-302793 A | 12/2009 |
| JP | 2010-081585 A | 4/2010 |
| JP | 2014-155194 A | 8/2014 |
| WO | 2012/142760 A1 | 10/2012 |

OTHER PUBLICATIONS

"Indicate." Merriam-Webster.com. Accessed Dec. 18, 2017. https://www.merriam-webster.com/dictionary/indicate.*
T. Nakagawa et al., "Non-Data-Aided Wide-Range Frequency Offset Estimator for QAM Optical Coherent Receivers", paper OMJ1, OSA/OFC/NFOEC, 2011.
A. J. Viterbi et al., "Nonlinear Estimation of PSK-Modulated Carrier Phase with Application to Burst Digital Transmission", IEEE Transactions of Information Theory, vol. IT-29. No. 4, Jul. 1983.
International Search Report for PCT/JP2014/053279, ISA/JP, dated Mar. 11, 2014, with English translation translation thereof.
Takayuki Hoshi, "D/A Conversion", Jan. 11, 2013, with English translation thereof (3 pages).
Office Action for JP 2015-500275, dated Jul. 26, 2016, with English translation thereof (10 pages).
Search Report for EP 14752142.1, dated Oct. 7, 2016, (6 pages).
Notice of Reasons for Rejection, Japanese Patent Application No. 2015-500275, Jan. 26, 2016.
Takayuki Hoshi, "D/A Conversion", Jan. 11, 2015, with English translation thereof (3 pages).
Chinese Office Action (OA-1) in the parallel application CN 201480008298.8, dated Nov. 3, 2017, with partial translation of Search Report.

* cited by examiner

32QAM

64QAM though digital signal processing. Further, in the digital coherent transmission scheme, phase synchronization is established through digital signal processing. For the establishment of phase synchronization, frequency offset estimation (for example, Non-Patent Document 1) and carrier phase synchronization (for example, Non-Patent Document 2) are necessary, and various algorithms have been studied in consideration of the circuit scale and a modulation format.

OPTICAL TRANSMISSION SYSTEM, PHASE COMPENSATION METHOD, AND OPTICAL RECEPTION APPARATUS

TECHNICAL FIELD

This application is a 371 U.S. National Phase of PCT/JP2014/053279, filed on Feb. 13, 2014 and published in Japanese as WO 2014/126132 A1 on Aug. 21, 2014. Priority is claimed on Japanese Patent Application No. 2013-025924, filed Feb. 13, 2013. The entire contents of both applications are incorporated herein by reference. The present invention relates to an optical transmission system, a phase compensation method, and an optical reception apparatus that compensates for phase noise generated in a transmission end, a reception end, and a transmission path in the optical transmission system to improve communication quality.

BACKGROUND ART

In a backbone optical transmission system, it is required to economically accommodate a high-speed client signal and transmit a large amount of information. For realization of such a purpose, a digital coherent transmission scheme that is a combination of coherent detection and digital signal processing has been studied from the viewpoint of improvement of frequency utilization efficiency, and realization of high-speed transmission of a large amount of information through wavelength-division multiplexing transmission using the digital coherent transmission scheme is expected. In the digital coherent transmission scheme, compensation of waveform degradation (for example, chromatic dispersion) generated in a transmission apparatus, a reception apparatus, and an optical fiber transmission path is performed through digital signal processing. Further, in the digital coherent transmission scheme, phase synchronization is established through digital signal processing. For the establishment of phase synchronization, frequency offset estimation (for example, Non-Patent Document 1) and carrier phase synchronization (for example, Non-Patent Document 2) are necessary, and various algorithms have been studied in consideration of the circuit scale and a modulation format.

PRIOR ART DOCUMENTS

Non-Patent Documents

Non-Patent Document 1: T. Nakagawa et al., "Non-Data-Aided Wide-Range Frequency Offset Estimator for QAM Optical Coherent Receivers", paper OMJ1, OSA/OFC/NFOEC 2011.
Non-Patent Document 2: A. J. Viterbi et al., "Nonlinear Estimation of PSK-Modulated Carrier Phase with Application to Burst Digital Transmission", IEEE Transactions on Information Theory, Vol. IT-29, No. 4, July 1983.

SUMMARY OF INVENTION

Problems to be Solved by the Invention

In the optical transmission system, there is a problem in that communication quality is degraded due to out-of phase synchronization in which the phase synchronization described above cannot be established and/or degradation of synchronization accuracy due to a frequency offset of light sources between a transmission end and a reception end, a phase variation caused by nonlinear optical effects in an optical fiber transmission path, or the like. Further, there is a problem in that the circuit scale increases when an advanced phase compensation algorithm is implemented.

The present invention has been made in consideration of such circumstances, and an object thereof is to provide an optical transmission system, a phase compensation method, and an optical reception apparatus capable of suppressing an increase in the circuit scale and performing phase compensation in accordance with a phase variation generated in an optical fiber transmission path.

Means for Solving the Problems

In order to solve the above problems, the present invention is an optical transmission system including: a pilot symbol detection unit which detects a plurality of pilot symbols intermittently inserted into a received complex electric field signal that is obtained through coherent detection for a received optical signal; an error signal computation unit which calculates a complex electric field error signal indicating a phase variation at each pilot symbol based on the pilot symbols detected by the pilot symbol detection unit and a predetermined reference symbol; a compensation electric field signal generation unit which estimates the phase variation between the pilot symbols in the received complex electric field signal using filter processing based on the complex electric field error signal calculated by the error signal computation unit; and a phase noise compensation unit which performs phase compensation for the received complex electric field signal based on the phase variation between the pilot symbols estimated by the compensation electric field signal generation unit.

Preferably, in the optical transmission system, the compensation electric field signal generation unit includes: a complex electric field interpolation unit which outputs a signal sequence in which a signal sequence having a length corresponding to a symbol section between the pilot symbols in the received complex electric field signal is interpolated between complex electric field error signals; and a low pass filter which receives the signal sequence output from the complex electric field interpolation unit.

Preferably, in the optical transmission system, the complex electric field interpolation unit interpolates the complex electric field error signal or a signal sequence of a complex signal having an amplitude of zero.

Preferably, in the optical transmission system, the compensation electric field signal generation unit includes: a low pass filter which receives an input of the complex electric field error signal; and a linear interpolation processing unit which calculates the phase variation in a symbol section between the pilot symbols in the received complex electric field signal through linear interpolation of an output of the low pass filter.

Preferably, in the optical transmission system, the compensation electric field signal generation unit further includes at least a second amplitude normalization unit among a first amplitude normalization unit which normalizes an amplitude of the complex electric field error signal calculated by the error signal computation unit, and the second amplitude normalization unit which normalizes an amplitude of a complex signal indicating the phase variation.

Preferably, in the optical transmission system, the compensation electric field signal generation unit includes: a phase difference computation unit which calculates phase signals indicating phases of complex electric field error signals; an interpolation unit which generates a signal sequence in which a complex electric field signal sequence having a length corresponding to a symbol section between the pilot symbols in the received complex electric field signal is inserted between the phase signals calculated by the phase difference computation unit; a low pass filter which receives the signal sequence generated by the interpolation unit; and a phase-to-electric field conversion unit which calculates a phase variation in the symbol section between the pilot symbols in the received complex electric field signal by converting an output of the low pass filter into a complex signal.

Preferably, in the optical transmission system, the interpolation unit interpolates the phase signals or a signal sequence of zero.

Preferably, in the optical transmission system, the compensation electric field signal generation unit includes: a phase difference computation unit which calculates a phase signal indicating a phase of the complex electric field error signal; a low pass filter which receives the phase signal calculated by the phase difference computation unit; a linear interpolation processing unit which calculates a phase in a symbol section between the pilot symbols in the received complex electric field signal through linear interpolation for an output of the low pass filter; and a phase-to-electric field conversion unit which calculates a phase variation in the symbol section between the pilot symbols in the received complex electric field signal by converting the phase calculated by the linear interpolation processing unit into a complex signal.

Preferably, in the optical transmission system, a cut-off frequency of the low pass filter is determined based on an interval at which the pilot symbols are located.

Preferably, in the optical transmission system, the compensation electric field signal generation unit includes: a low pass filter which receives the complex electric field error signal; a first linear interpolation processing unit which divides a section of a symbol interval of an output of the low pass filter into a predetermined number of symbol sections and calculates a phase variation of a boundary point between the divided symbol sections excluding the output of the low pass filter based on the output of the low pass filter through linear interpolation; an amplitude normalization unit which normalizes an amplitude of a complex signal indicating the phase variation of the boundary point including the output of the low pass filter; and a second linear interpolation processing unit which calculates a phase variation in the divided symbol sections based on the phase variation of the boundary point after normalization through linear interpolation.

Preferably, in the optical transmission system, the compensation electric field signal generation unit includes: a residual frequency offset estimation unit which receives an input of the complex electric field error signal; a first low pass filter which receives an input of the complex electric field error signal; and a computation unit which multiplies an input and an output of the first low pass filter by an output of the residual frequency offset estimation unit, and the residual frequency offset estimation unit includes: a phase slope detection unit which calculates an instantaneous value of a residual frequency offset based on the complex electric field error signal; a second low pass filter which averages output values of the phase slope detection unit; an electric field-to-phase conversion unit which converts a complex electric field value output from the second low pass filter to a phase value; an integration unit which integrates the phase value output from the electric field-to-phase conversion unit; and a phase-to-electric field conversion unit which converts an integration value output from the integration unit into a complex electric field value as a phase value.

Preferably, in the optical transmission system, the residual frequency offset estimation unit includes a coefficient setting unit which multiplies an output of the electric field-to-phase conversion unit by a coefficient in accordance with an interval between the pilot symbols.

Preferably, in the optical transmission system, the pilot symbol detection unit includes: a synchronization pattern detection unit which receives a transmission frame, the transmission frame including a synchronization pattern including consecutive symbols, the pilot symbols inserted into transmission data at intervals of a predetermined number of symbols relative to the synchronization pattern, and the transmission data, and detects a position of the synchronization pattern; and a pilot symbol extraction unit which detects positions of the pilot symbols from the detected position of the synchronization pattern and extracts the pilot symbols.

Preferably, in the optical transmission system, a pseudo random bit sequence is used as the synchronization pattern.

Preferably, in the optical transmission system, when there is an amplitude level having three or more values in modulation for the synchronization pattern, a symbol having an amplitude level other than a maximum amplitude level and a minimum amplitude level is assigned to the synchronization pattern.

Preferably, in the optical transmission system, the synchronization pattern is assigned to two symbols having a phase difference of 180° in modulation for the synchronization pattern.

Preferably, in the optical transmission system, the synchronization pattern detection unit detects the synchronization pattern included in the received complex electric field signal based on a hard decision result for a differential detection signal obtained by performing differential detection on the received complex electric field signal.

Further, in order to solve the above problems, the present invention is a phase compensation method in an optical transmission system, the method including: a pilot symbol detection step of detecting a plurality of pilot symbols intermittently inserted into a received complex electric field signal that is obtained through coherent detection for a received optical signal; an error signal computation step of calculating a complex electric field error signal indicating a phase variation at each pilot symbol based on the pilot symbols detected in the pilot symbol detection step and a predetermined reference symbol; a compensation electric field signal generation step of estimating the phase variation between the pilot symbols in the received complex electric field signal using filter processing based on the complex electric field error signal calculated in the error signal computation step; and a phase noise compensation step of performing phase compensation on the received complex electric field signal based on the phase variation between the pilot symbols estimated in the compensation electric field signal generation step.

Further, in order to solve the above problems, the present invention is an optical reception apparatus including: a pilot symbol detection unit which detects a plurality of pilot symbols intermittently inserted into a received complex electric field signal that is obtained through coherent detection for a received optical signal; an error signal computation unit which calculates a complex electric field error signal indicating a phase variation at each pilot symbol based on the pilot symbols detected by the pilot symbol detection unit and a predetermined reference symbol; a compensation electric field signal generation unit which estimates the phase variation between the pilot symbols in the received complex electric field signal using filter processing based on the complex electric field error signal calculated by the error signal computation unit; and a phase noise compensation unit which performs phase compensation for the received complex electric field signal based on the phase variation between the pilot symbols estimated by the compensation electric field signal generation unit.

Advantageous Effects of Invention

In accordance with the present invention, since filter processing is used when the phase variation for each pilot symbol included in the received complex electric field signal is calculated and the phase variation for a signal such as data between the pilot symbols is calculated, it is possible to acquire the phase variation in the received complex electric field signal and to perform phase compensation without performing calculation of a phase angle for a signal between pilot symbols and a continuity process for the phase variation. As a result, it is possible to omit a process which increases the computational complexity and the circuit scale for the calculation of the phase angle and the continuity process for the phase variation, and to reduce the computational complexity and the circuit scale.

MODES FOR CARRYING OUT THE INVENTION

Hereinafter, an optical transmission system, a phase compensation method, and an optical reception apparatus in embodiments of the present invention will be described with reference to the drawings.

First Embodiment

Figure 1:
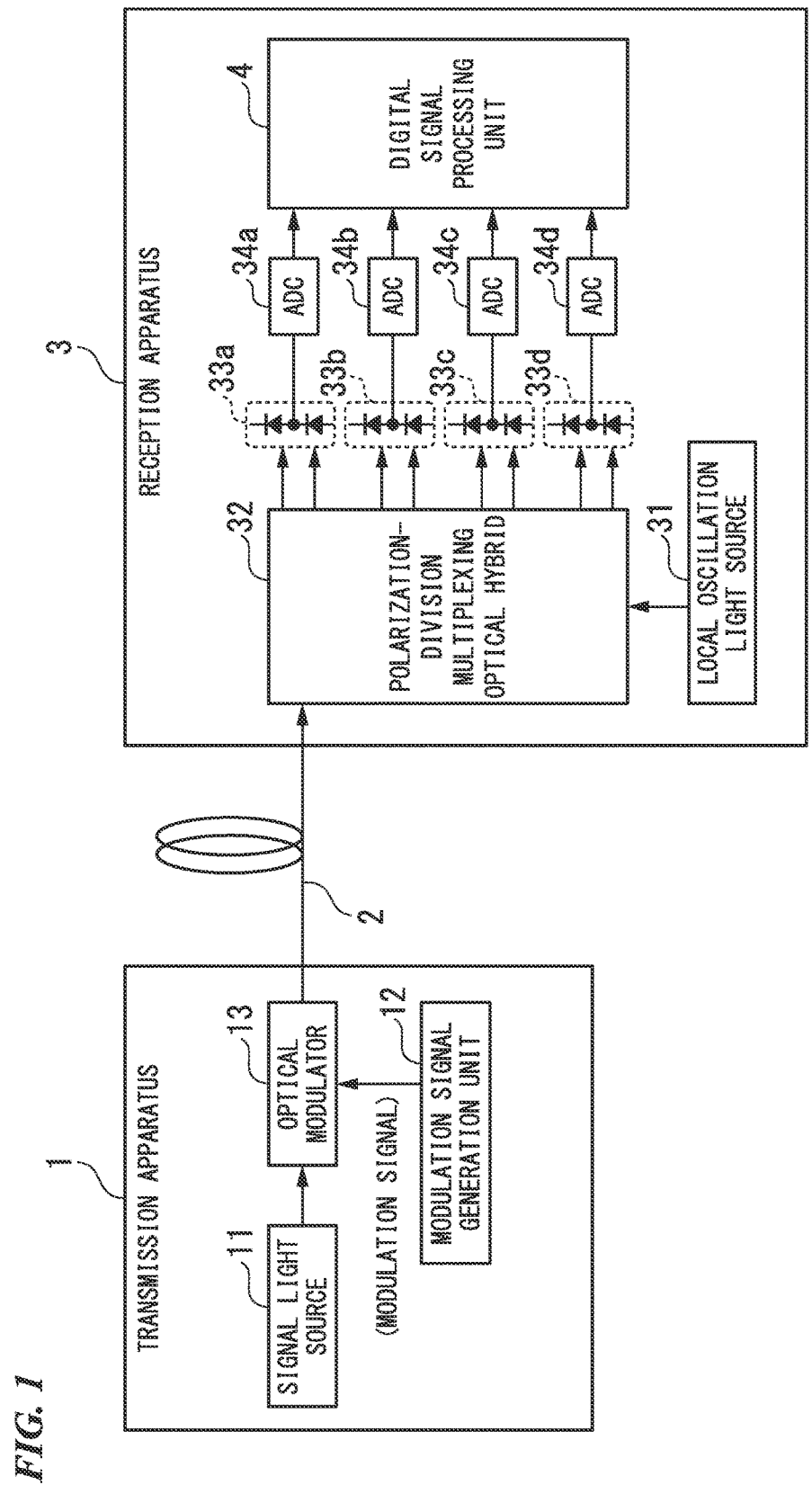
FIG. 1 is a block diagram illustrating an example of a configuration of an optical transmission system in a first embodiment.

FIG. 1 is a block diagram illustrating an example of a configuration of an optical transmission system in a first embodiment. The optical transmission system includes a transmission apparatus 1 that performs transmission of data using a digital coherent transmission scheme, an optical fiber transmission path 2, and a reception apparatus 3. The transmission apparatus 1 generates modulated light including data to be transmitted, and outputs the generated modulated light to the optical fiber transmission path 2. The modulated light output from the transmission apparatus 1 propagates along the optical fiber transmission path 2. The reception apparatus 3 receives the modulated light propagated along the optical fiber transmission path 2, and acquires the data from the received modulated light.

The transmission apparatus 1 includes a signal light source 11, a modulation signal generation unit 12, and an optical modulator 13. The signal light source 11 generates continuous wave (CW) light and outputs the generated CW light to the optical modulator 13. The modulation signal generation unit 12 generates a modulation signal including the data to be transmitted, a pilot symbol, and a synchronization pattern, and outputs the modulation signal to the optical modulator 13. The optical modulator 13 modulates the CW light based on the modulation signal to generate modulation light, and outputs the modulation light to the optical fiber transmission path 2.

Figure 2:
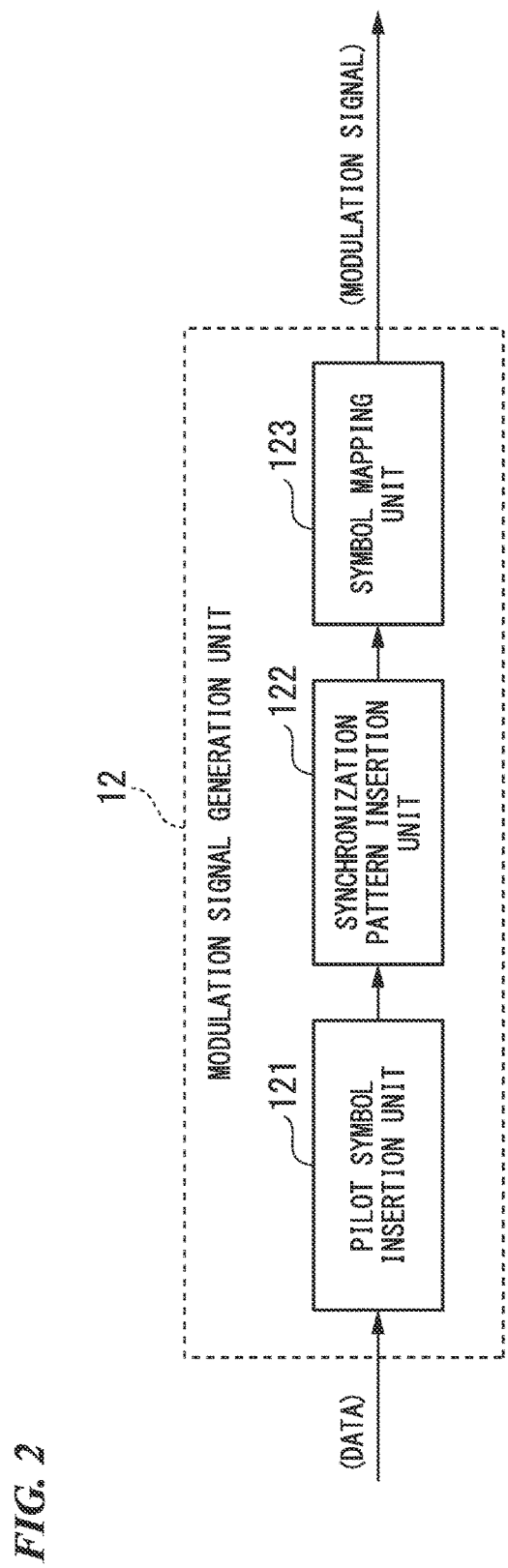
FIG. 2 is a block diagram illustrating an example of a configuration of a modulation signal generation unit 12 in the first embodiment.

FIG. 2 is a block diagram illustrating an example of a configuration of the modulation signal generation unit 12 in the present embodiment. The modulation signal generation unit 12 includes a pilot symbol insertion unit 121, a synchronization pattern insertion unit 122, and a symbol mapping unit 123. Data to be transmitted is input to the pilot symbol insertion unit 121. The pilot symbol insertion unit 121 inserts a pilot symbol having a predetermined symbol length into the input data so that the pilot symbol is included at an interval of K symbols (K is an integer greater than or equal to 1). The pilot symbol insertion unit 121 outputs, to the synchronization pattern insertion unit 122, a data sequence obtained by inserting the pilot symbol into the data.

The synchronization pattern insertion unit 122 inserts a synchronization pattern including a plurality of symbols into the data sequence output from the pilot symbol insertion unit 121. The synchronization pattern insertion unit 122 outputs a data sequence obtained by inserting the synchronization pattern to the symbol mapping unit 123. The symbol mapping unit 123 modulates the data sequence output from the synchronization pattern insertion unit 122 using a predetermined modulation scheme to generate a modulation signal. The symbol mapping unit 123 outputs the generated modulation signal to the optical modulator 13. It is to be noted that an order of the pilot symbol insertion unit 121 and the synchronization pattern insertion unit 122 may be reversed so that the synchronization pattern is inserted and then the pilot symbol is inserted. In this case, the pilot symbol is similarly included in every K symbols.

Figure 3:
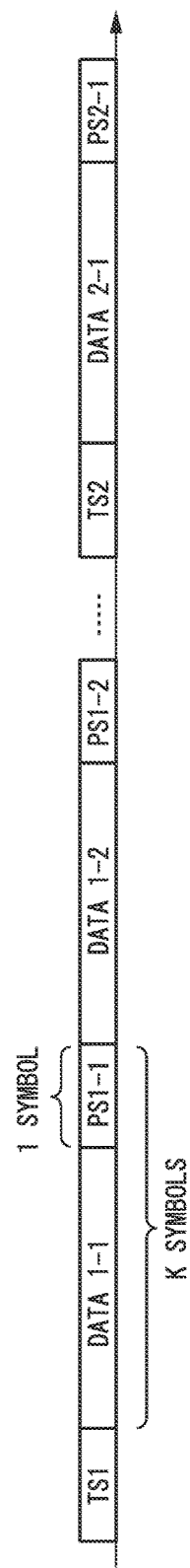
FIG. 3 is a schematic diagram illustrating an example of a frame structure of a modulation signal generated by the modulation signal generation unit 12 in the first embodiment.

FIG. 3 is a schematic diagram illustrating an example of a frame structure of the modulation signal generated by the modulation signal generation unit 12 in the present embodiment. In FIG. 3, a horizontal axis indicates time (symbol). As illustrated in FIG. 3, a synchronization pattern (TS), data, and a pilot symbol (PS) are included in the frame structure of the modulation signal. FIG. 3 illustrates a case in which a symbol length of the pilot symbol is 1. There is a sub-frame having a symbol length of K symbols in which data and an intermittently inserted pilot symbol are included, and the synchronization pattern is added to a plurality of sub-frames.

Referring back to FIG. 1, the configuration of the optical transmission system will continue to be described.

The reception apparatus 3 includes a local oscillation light source 31, a polarization-division multiplexing optical hybrid 32, balance detectors 33a to 33d, analog-to-digital converters (ADCs) 34a to 34d, and a digital signal processing unit 4. The local oscillator 31 generates a CW light, and outputs the generated CW light to the polarization-division multiplexing optical hybrid 32. The received modulation light and the CW light are input to the polarization-division multiplexing optical hybrid 32. The polarization-division multiplexing optical hybrid 32 detects an optical signal of an in-phase component of the modulation light and an optical signal of a quadrature component of the modulation light through coherent detection using the CW light. The polarization-division multiplexing optical hybrid 32 outputs the detected optical signal of the in-phase component and the detected optical signal of the quadrature component to the balance detectors 33a to 33d.

The balance detectors 33a to 33d convert the input optical signals to electrical signals and output the electrical signals to the analog-to-digital converters 34a to 34d. The analog-to-digital converters 34a to 34d digitize the electrical signals input from the balance detectors 33a to 33d. The analog-to-digital converters 34a to 34d input the reception digital signals obtained by the digitization to the digital signal processing unit 4. The digital signal processing unit 4, for example, compensates the input reception digital signals for: chromatic dispersion, nonlinear optical effects, and/or polarization mode dispersion applied to the modulation light in the optical fiber transmission path 2; and for a frequency offset caused by a frequency difference of the CW light between light sources of the transmission apparatus 1 and the reception apparatus 3.

Figure 4:
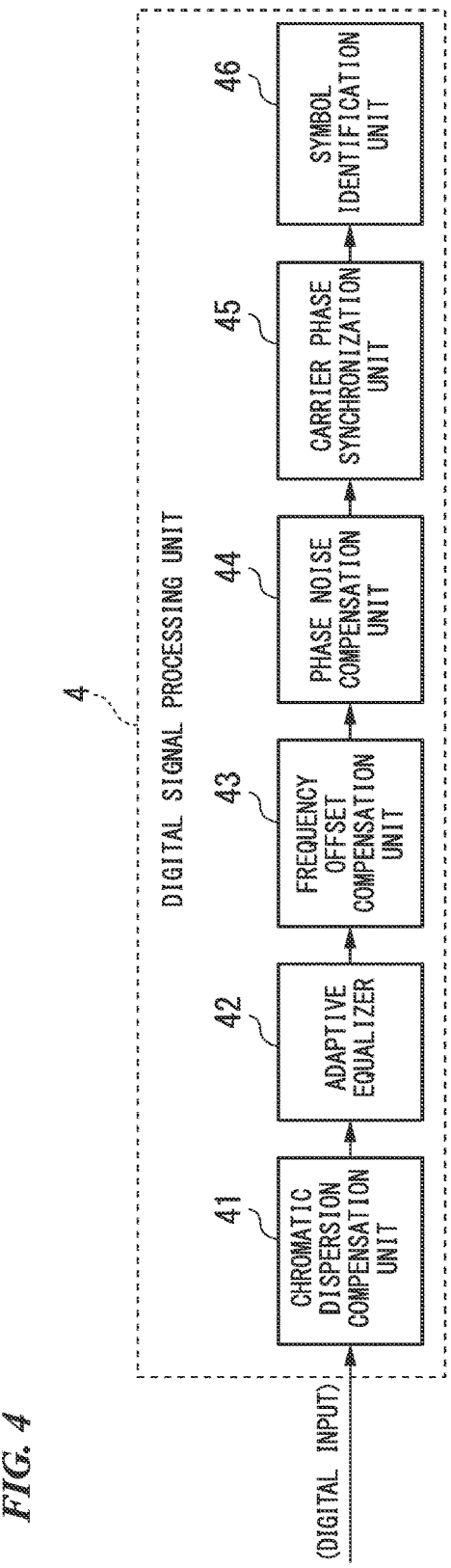
FIG. 4 is a block diagram illustrating an example of a configuration of a digital signal processing unit 4 in the first embodiment.

FIG. 4 is a block diagram illustrating an example of a configuration of the digital signal processing unit 4 in the present embodiment. The digital signal processing unit 4 includes a chromatic dispersion compensation unit 41, an adaptive equalizer 42, a frequency offset compensation unit 43, a phase noise compensation unit 44, a carrier phase synchronization unit 45, and a symbol identification unit 46. The reception digital signals input from the analog-to-digital converters 34a to 34d to the digital signal processing unit 4 are input to the chromatic dispersion compensation unit 41. The chromatic dispersion compensation unit 41 compensates for signal degradation due to chromatic dispersion in the optical fiber transmission path 2. The adaptive equalizer 42 performs separation of X polarization and Y polarization and compensation of polarization mode dispersion on a signal compensated in the chromatic dispersion compensation unit 41. The frequency offset compensation unit 43 compensates for a frequency offset caused by the frequency difference of the CW light between the light sources of the transmission apparatus 1 and the reception apparatus 3 on the signal compensated in the adaptive equalizer 42.

The phase noise compensation unit 44 compensates the signal compensated by the frequency offset compensation unit 43 for a phase difference caused by a phase variation due to residual frequency offset and/or non-linear optical effects that could not be compensated for by the frequency offset compensation unit 43. The carrier phase synchronization unit 45 performs carrier phase synchronization on the signal compensated by the phase noise compensation unit 44. The symbol identification unit 46 performs demodulation corresponding to the modulation scheme used in the symbol mapping unit 123 of the transmission apparatus 1 on the signal subjected to the carrier phase synchronization in the carrier phase synchronization unit 45, and acquires the data transmitted from the transmission apparatus 1.

Figure 5:
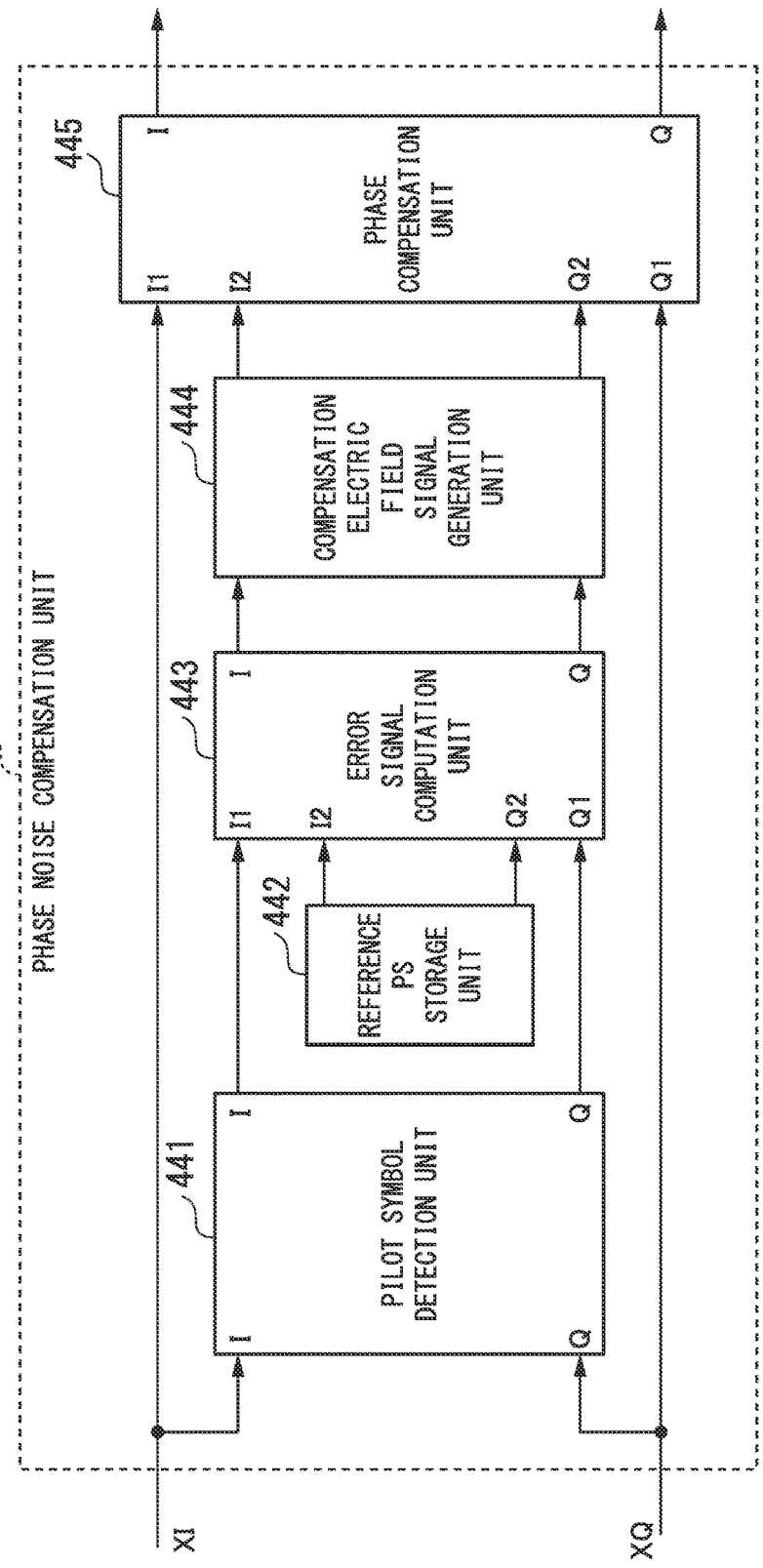
FIG. 5 is a block diagram illustrating a configuration of a phase noise compensation unit 44 in the first embodiment.

FIG. 5 is a block diagram illustrating a configuration of the phase noise compensation unit 44 in the present embodiment. The phase noise compensation unit 44 includes a pilot symbol detection unit 441, a reference pilot symbol storage unit (reference PS storage unit) 442, an error signal computation unit 443, a compensation electric field signal generation unit 444, and a phase compensation unit 445. The signal (hereinafter referred to as a received complex electric field signal) input from the frequency offset compensation unit 43 to the phase noise compensation unit 44 is input to the pilot symbol detection unit 441 and the phase compensation unit 445. FIG. 5 illustrates the received complex electric field signal as an in-phase component XI and a quadrature component XQ of the X polarization separately. The same applies to a configuration on the Y polarization.

Figure 6:
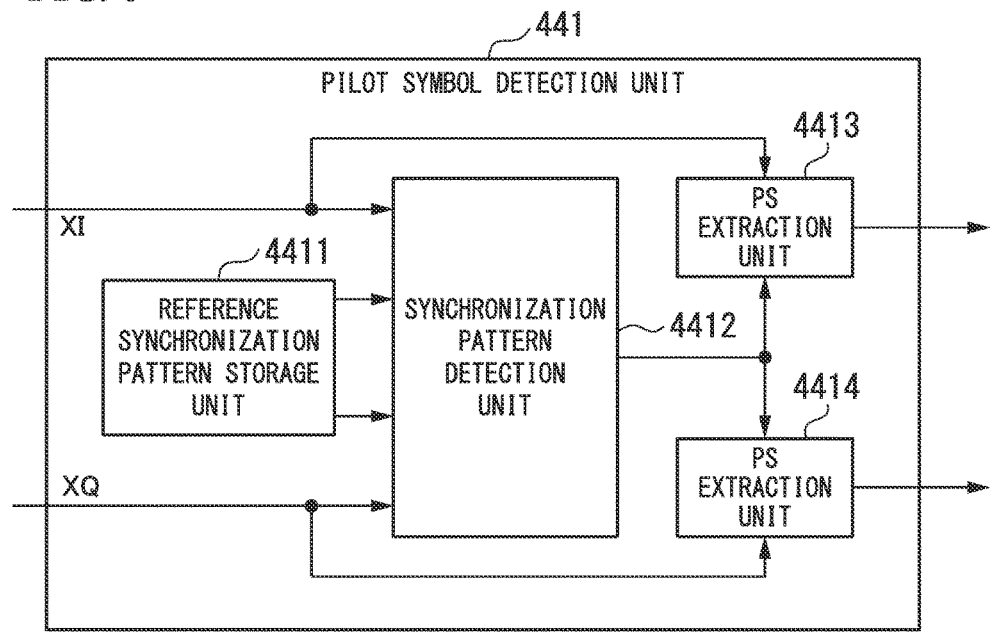
FIG. 6 is a block diagram illustrating a configuration of a pilot symbol detection unit 441 in the first embodiment.

The pilot symbol detection unit 441 detects the position of pilot symbols included in the input received complex electric field signal, and extracts the pilot symbols included in the received complex electric field signal. FIG. 6 is a block diagram illustrating a configuration of the pilot symbol detection unit 441 in the present embodiment. The pilot symbol detection unit 441 includes a reference synchronization pattern storage unit 4411, a synchronization pattern detection unit 4412, and pilot extraction units (PS extraction units) 4413 and 4414. A synchronization pattern that is inserted by the synchronization pattern insertion unit 122 of the transmission apparatus 1 is stored in advance as a reference pattern in the reference synchronization pattern storage unit 4411.

The synchronization pattern detection unit 4412 detects the position of the synchronization patterns included in the received complex electric field signal using a cross-correlation between the reference pattern stored in the reference synchronization pattern storage unit 4411 and the input received complex electric field signal. The synchronization pattern detection unit 4412 outputs the detected position of the synchronization patterns to the pilot symbol extraction units 4413 and 4414.

The in-phase component of the received complex electric field signal and the position of the synchronization patterns detected by the synchronization pattern detection unit 4412 are input to the pilot symbol extraction unit 4413. The pilot symbol extraction unit 4413 identifies the position of the pilot symbol included in the received complex electric field signal based on the position of the synchronization pattern, and extracts the pilot symbol from the received complex electric field signal. The pilot symbol extraction unit 4413 outputs the extracted pilot symbol (the in-phase component) to the error signal computation unit 443. The quadrature component of the received complex electric field signal and the position of the synchronization patterns detected by the synchronization pattern detection unit 4412 are input to the pilot symbol extraction unit 4414. The pilot symbol extraction unit 4414 extracts the pilot symbol (quadrature component) and outputs the pilot symbol to the error signal operation unit 443, similarly to the pilot symbol extraction unit 4413.

With the configuration described above, the pilot symbol detection unit 441 extracts the pilot symbol from the received complex electric field signal. In the pilot symbol extracted by the pilot symbol detection unit 441, phase noise that could not be compensated by a compensation unit (for example, the frequency offset compensation unit 43) in a previous stage of the phase noise compensation unit 44 remains. This phase noise is, for example, caused by noise applied to the optical fiber transmission path 2, the transmission apparatus 1, and/or, the reception apparatus 3.

Referring back to FIG. 5, the configuration of the phase noise compensation unit 44 will continue to be described.

The pilot symbol inserted by the pilot symbol insertion unit 121 of the transmission apparatus 1 is stored as a reference symbol in the reference pilot symbol storage unit 442. The error signal computation unit 443 calculates a complex electric field error signal based on the reference symbol ($E_{ref}$) stored in the reference pilot symbol storage unit 442 and a pilot symbol ($E_{PS}$) extracted in the pilot symbol detection unit 441. The error signal computation unit 443 outputs the calculated complex electric field error signal to the compensation electric field signal generation unit 444. Calculation of the complex electric field error signal ($E_{err}$) is performed, for example, using Equation (1) below. It is to be noted that $E_{ref}{}^*$ in Equation (1) is a complex conjugate value of the reference symbol ($E_{ref}$).

[Equation 1]

$$E_{err} = E_{PS} \times E_{ref}{}^* \qquad (1)$$

Figure 7:
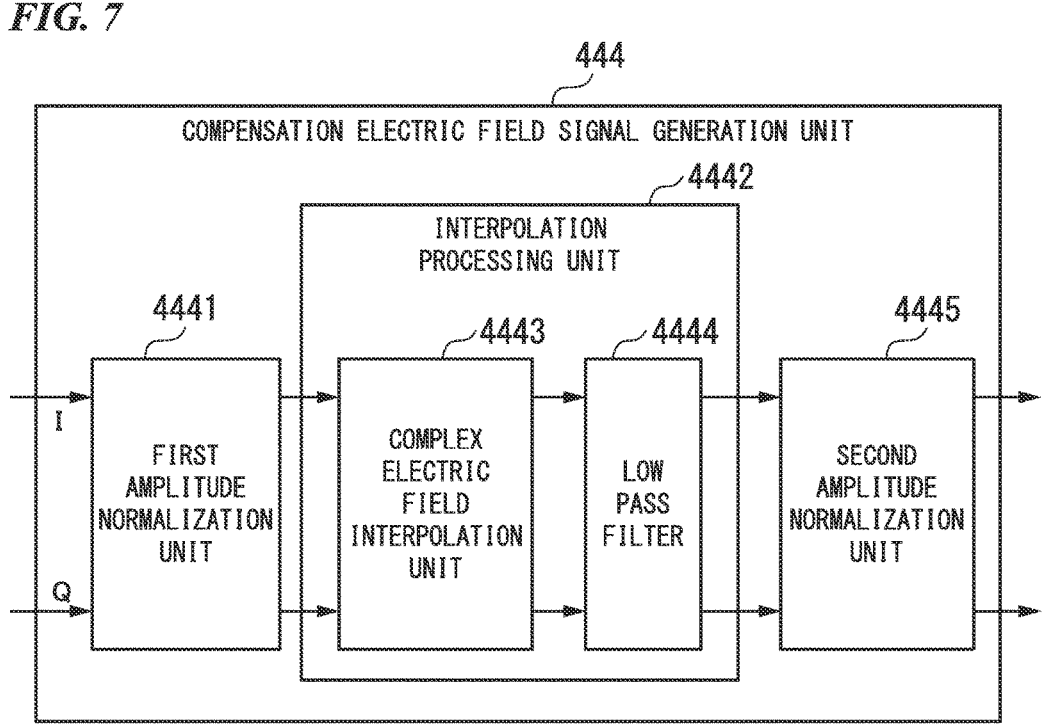
FIG. 7 is a block diagram illustrating a configuration of a compensation electric field signal generation unit 444 in the first embodiment.

The compensation electric field signal generation unit 444 estimates the phase noise of the data between the pilot symbols in the received complex electric field signal based on the complex electric field error signal calculated by the error signal computation unit 443. FIG. 7 is a block diagram illustrating a configuration of the compensation electric field signal generation unit 444 in present embodiment. The compensation electric field signal generation unit 444 includes a first amplitude normalization unit 4441, an interpolation processing unit 4442, and a second amplitude normalization unit 4445.

An amplitude of the complex electric field error signal input to the compensation electric field signal generation unit 444 is a product of amplitudes of the reference symbol ($E_{ref}$) of the reference pilot symbol storage unit 442 and the pilot symbol ($E_{PS}$) extracted by the pilot symbol detection unit 441. The first amplitude normalization unit 4441 detects an amplitude value of the input complex electric field error signal. The first amplitude normalization unit 4441 multiplies the complex electric field error signal by a reciprocal of the detected amplitude value to normalize the complex electric field error signal and causes the amplitude of the complex electric field error signal to be 1. The first amplitude normalization unit 4441 outputs the normalized complex electric field error signal to the interpolation processing unit 4442. Through the normalization performed by the first amplitude normalization unit 4441, it is possible to eliminate amplitude dependence of a reference symbol having a different amplitude value. However, when the pilot symbol having constant amplitude is inserted in the transmission apparatus 1, the first amplitude normalization unit 4441 may be omitted. In this case, it is possible to reduce the computational complexity and the circuit scale in the compensation electric field signal generation unit 444.

Further, since the first amplitude normalization unit 4441 is used for adjustment of the amplitude of the complex electric field error signal, a computation other than the above-described computation may be used. For example, multiplication of a reciprocal of a square of the amplitude of the reference symbol ($E_{ref}$) may be performed so that the amplitude of the complex electric field error signal may be normalized to be a ratio of the amplitude of the pilot symbol ($E_{PS}$) and the reference symbol ($E_{ref}$). When the normalization computation is not performed, the first amplitude normalization unit 4441 may be omitted. The present embodiment describes a case in which the amplitude of the complex electric field error signal has been normalized to be 1.

The interpolation processing unit 4442 includes a complex electric field interpolation unit 4443, and a low pass filter 4444. The complex electric field error signal normalized by the first amplitude normalization unit 4441 is input to the complex electric field interpolation unit 4443. The complex electric field interpolation unit 4443 inserts zero between input complex electric field error signals, or replicates and inserts the value of the complex electric field error signal corresponding to the pilot symbol position closer to each symbol position. That is, the complex electric field interpolation unit 4443 performs zero padding or replica insertion on the symbol section between the complex electric field error signals that exists every K symbols. The complex electric field interpolation unit 4443 inputs a symbol sequence generated by inserting the zero or a replicated value into the symbol between the complex electric field error signals to the low pass filter 4444.

Figure 8:
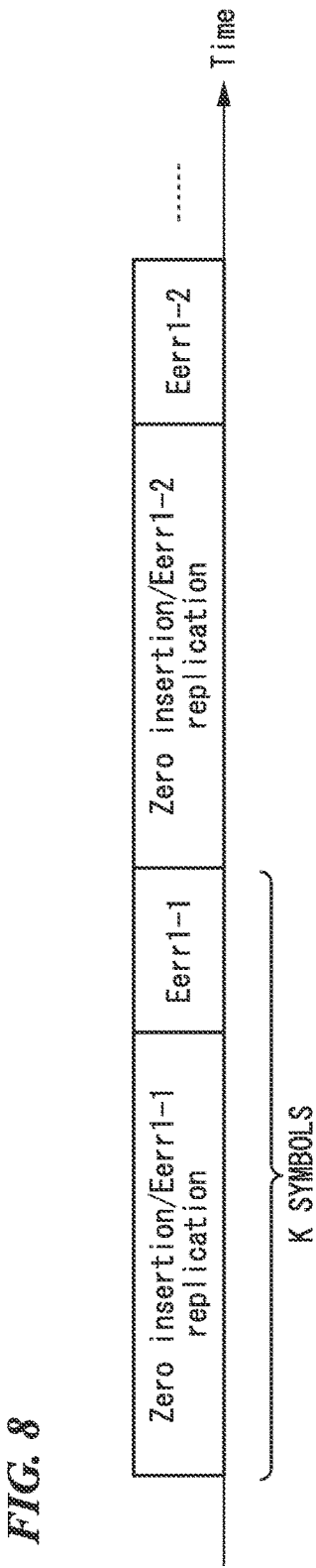
FIG. 8 is a diagram illustrating an example of a signal generated by a complex electric field interpolation unit 4443 in the first embodiment.

FIG. 8 is a diagram illustrating an example of a signal generated by the complex electric field interpolation unit 4443 in the present embodiment (a symbol sequence input to the low pass filter 4444). In FIG. 8, a horizontal axis indicates time (symbol). A symbol is interpolated between the complex electric field error signals ($E_{err}1$-1, $E_{err}1$-2, . . . ) that exist every K symbols.

Referring back to FIG. 7, the configuration of the compensation electric field signal generation unit 444 will continue to be described.

The low pass filter 4444 performs a process of passing a predetermined frequency component included in the symbol sequence which is input from the complex electric field interpolation unit 4443. Through this process, it is possible to interpolate a data portion between the complex electric field error signals, and to estimate the phase noise of the data portion located between the pilot symbols in the received complex electric field signal. When an insertion interval of the pilot symbol is T [sec], the cut-off frequency F [Hz] of the low pass filter 4444 is set to a frequency that is lower than (½T) [Hz] (F<(½T)) so that the phase noise of (½T) [Hz] can be estimated. The low pass filter 4444 inputs the symbol sequence obtained through the above filtering process as a phase noise sequence to the second amplitude normalization unit 4445.

The second amplitude normalization unit 4445 performs normalization on the amplitude of each symbol in the input phase noise sequence. The normalization of the amplitude performed by the second amplitude normalization unit 4445 is a process of causing the amplitude of each symbol in the input phase noise sequence to be 1. The second amplitude normalization unit 4445 inputs the normalized phase noise sequence to the phase compensation unit 445 as the compensation electric field signal.

Figure 9:
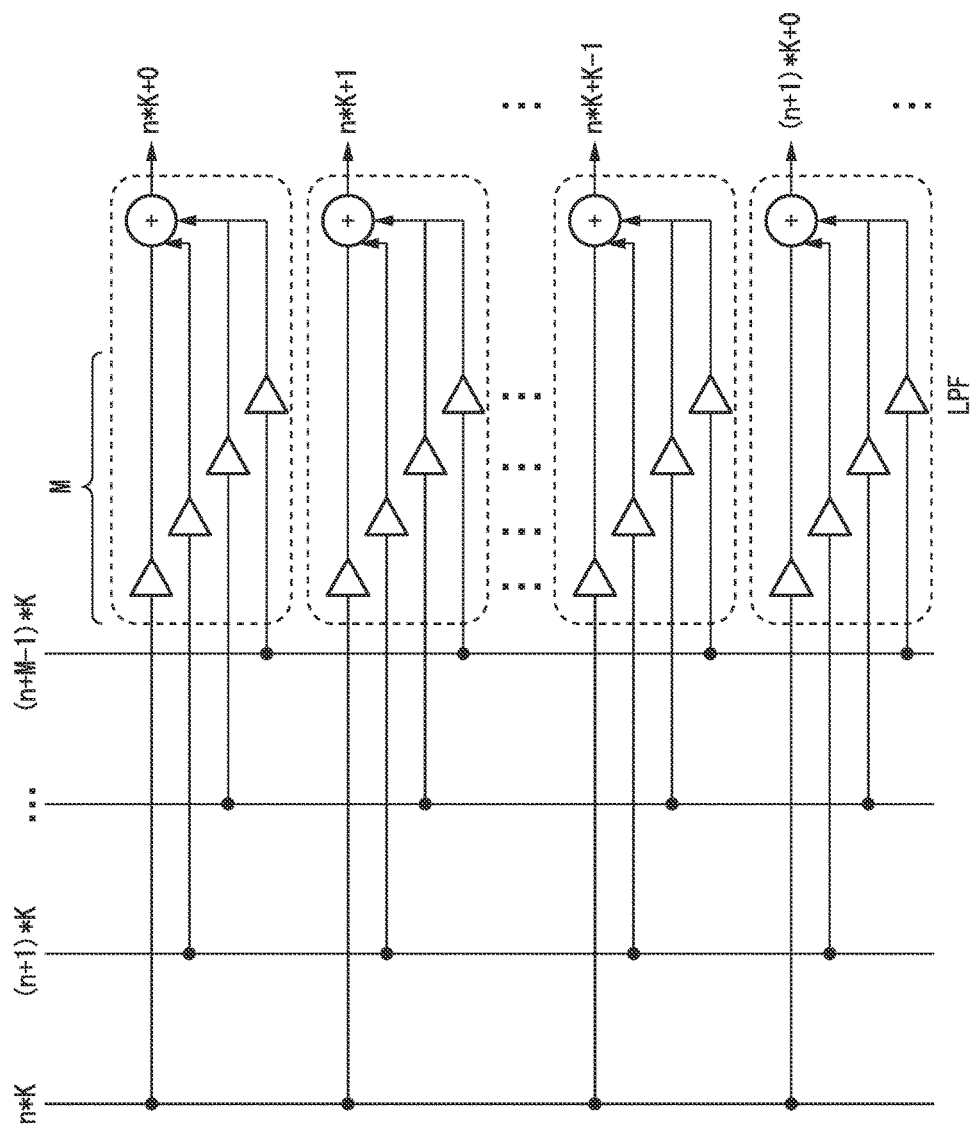
FIG. 9 is a block diagram illustrating an example of a configuration of a low pass filter 4444 in the first embodiment.

FIG. 9 is a block diagram illustrating an example of a configuration of the low pass filter 4444 in the present embodiment. In FIG. 9, K is an interval between pilot symbols. FIG. 9 illustrates an example in which symbols in the data portion are interpolated using a low pass filter (LPF) having M taps. When the complex electric field interpolation unit 4443 interpolates zero into the data portion, the value of the data portion does not contribute to the output of the low pass filter, and thus it is sufficient that a process of performing a computation on the complex electric field error signal is performed. In this case, it is possible to reduce the computational complexity and the circuit scale of the low pass filter. Further, since the pilot symbol (or the complex electric field error signal corresponding to the pilot symbol) exists only in every K symbols, it is possible to cause operating speed of a preceding stage of the low pass filter to be 1/K and further reduce the circuit scale.

Referring back to FIG. 5, the configuration of the phase noise compensation unit 44 will continue to be described.

The received complex electric field signal tapped before the pilot symbol detection unit 441 and the compensation electric field signal from the second amplitude normalization unit 4445 of the compensation electric field signal generation unit 444 are input to the phase compensation unit 445. The phase compensation unit 445 calculates the complex conjugate value of the compensation electric field signal, and complex-multiplies the received complex electric field signal by the calculated complex conjugate value. Thereby, it is possible to compensate for the phase noise of the data portion estimated using the pilot symbol.

The phase noise compensation unit 44 in the present embodiment can compensate for phase noise through the normalization and the complex multiplication process without directly calculating the phase angle of the complex electric field error signal. Therefore, it is not necessary for the phase noise compensation unit 44 to include, for example, a configuration for calculating the phase angle, such as a memory (table) in which phase angles corresponding to the values of the in-phase component and the quadrature component of the complex electric field error signal are stored, and a configuration for referring to the memory. Accordingly, it is possible to simplify the configuration of the phase noise compensation unit 44, and reduce the circuit scale when the phase noise compensation unit 44 is implemented on the circuit or the like.

Further, since the phase noise compensation unit 44 does not calculate the phase angle, an unwrapping process for achieving the continuity of the phase angle is not necessary, and it is possible to stably perform the phase compensation and reduce the circuit scale. It is to be noted that the unwrapping process is a process of limiting a phase difference between a symbol of interest and an immediately previous symbol to a range of ±π and calculating the phase angle of interest.

By using the phase noise compensation unit 44 having the above configuration, it is possible to realize the establishment of phase synchronization and improvement of communication quality by estimating a phase variation generated in the transmission apparatus 1, the optical fiber transmission path 2, and the reception apparatus 3 and performing phase compensation on data.

Figure 10:
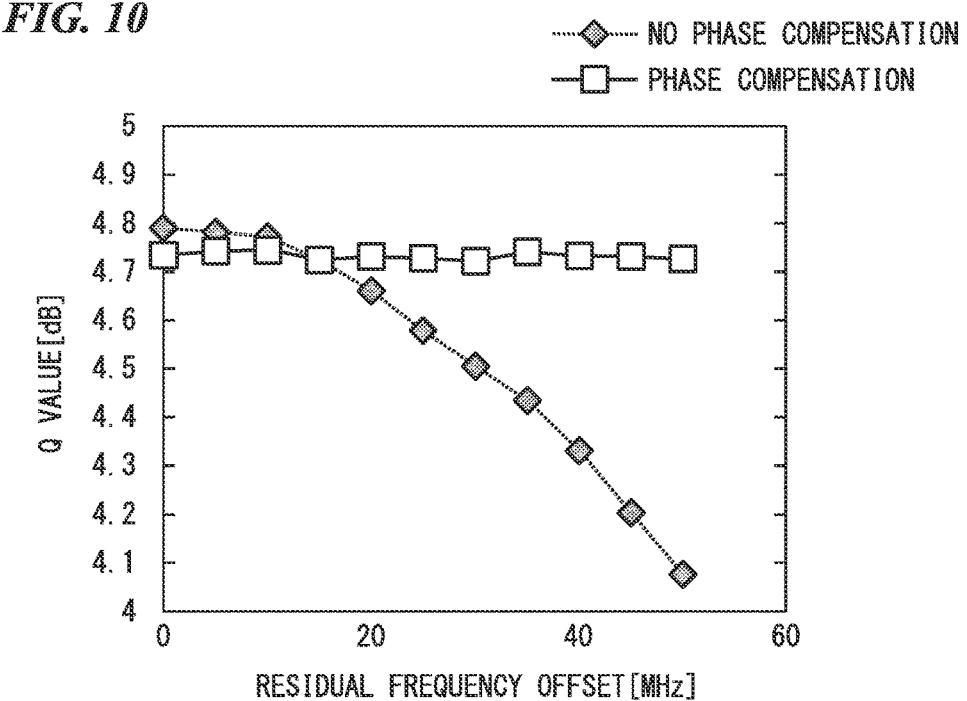
FIG. 10 is a graph showing quality (Q value) improvement achieved by the phase noise compensation unit 44 of the first embodiment.

FIG. 10 is a graph showing quality (Q value) improvement achieved by the phase noise compensation unit 44 of the present embodiment. In FIG. 10, a horizontal axis indicates the residual frequency offset, and a vertical axis indicates the Q value. The residual frequency offset indicates a frequency offset remaining in the received complex electric field signal. In FIG. 10, Q values when the process in the phase noise compensation unit 44 has been performed (phase compensation) and when the process in the phase noise compensation unit 44 has not been performed (no phase compensation) are shown. When the phase compensation has not been performed, the Q value decreases after the residual frequency offset exceeds about 10 [MHz], whereas by performing the phase compensation, it is possible to prevent the Q value from decreasing due to an increase in the residual frequency offset and improve tolerance of the frequency offset.

Second Embodiment

A configuration of an interpolation processing unit different from the interpolation processing unit 4442 of the first embodiment will be described in a second embodiment. The interpolation processing unit in the second embodiment performs a process without performing interpolation on a data portion between complex electric field error signals.

Figure 11:
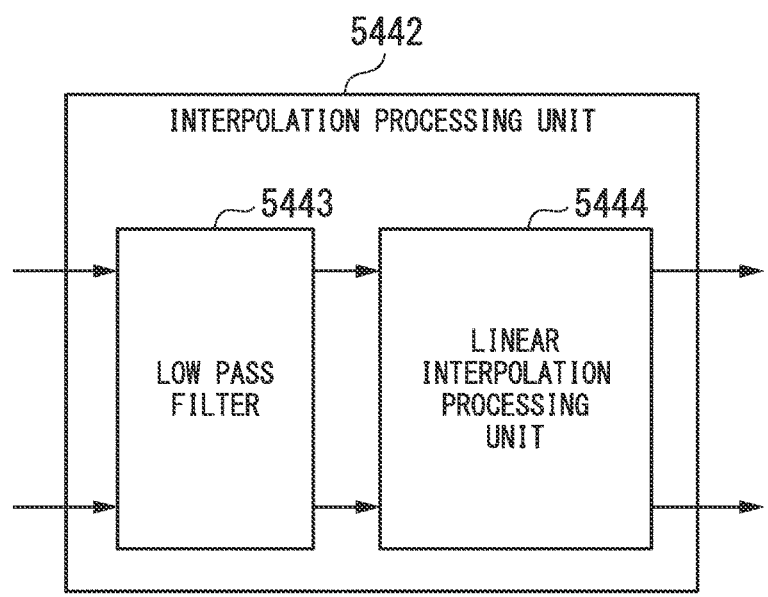
FIG. 11 is a block diagram illustrating a configuration of an interpolation processing unit 5442 in a second embodiment.

FIG. 11 is a block diagram illustrating a configuration of an interpolation processing unit 5442 in the second embodiment. The interpolation processing unit 5442 includes a low pass filter 5443 and a linear interpolation processing unit 5444. A normalized complex electric field error signal from the first amplitude normalization unit 4441 is input to the low pass filter 5443. The low pass filter 5443 performs a process of passing a predetermined frequency component included in the input complex electric field error signal. Through this process, the complex electric field error signal is averaged. The linear interpolation processing unit 5444 calculates the phase noise of the data portion through linear interpolation using the complex electric field error signal averaged by the low pass filter 5443. The linear interpolation processing unit 5444 inputs a phase noise sequence including the averaged complex electric field error signal and the calculated phase noise of the data portion to the second amplitude normalization unit 4445.

Figure 12:
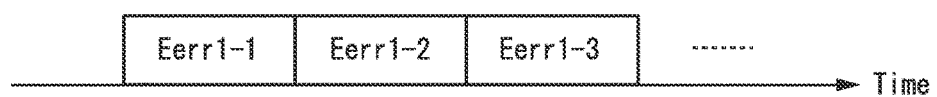
FIG. 12 is a diagram illustrating an example of a complex electric field error signal input to a low pass filter 5443 in the second embodiment.

FIG. 12 is a diagram illustrating an example of a complex electric field error signal that is input to the low pass filter 5443 in the present embodiment. In FIG. 12, a horizontal axis indicates time (symbol). As illustrated in FIG. 12, the signal input to the low pass filter 5443 is a signal including the complex electric field error signal.

Figure 13:
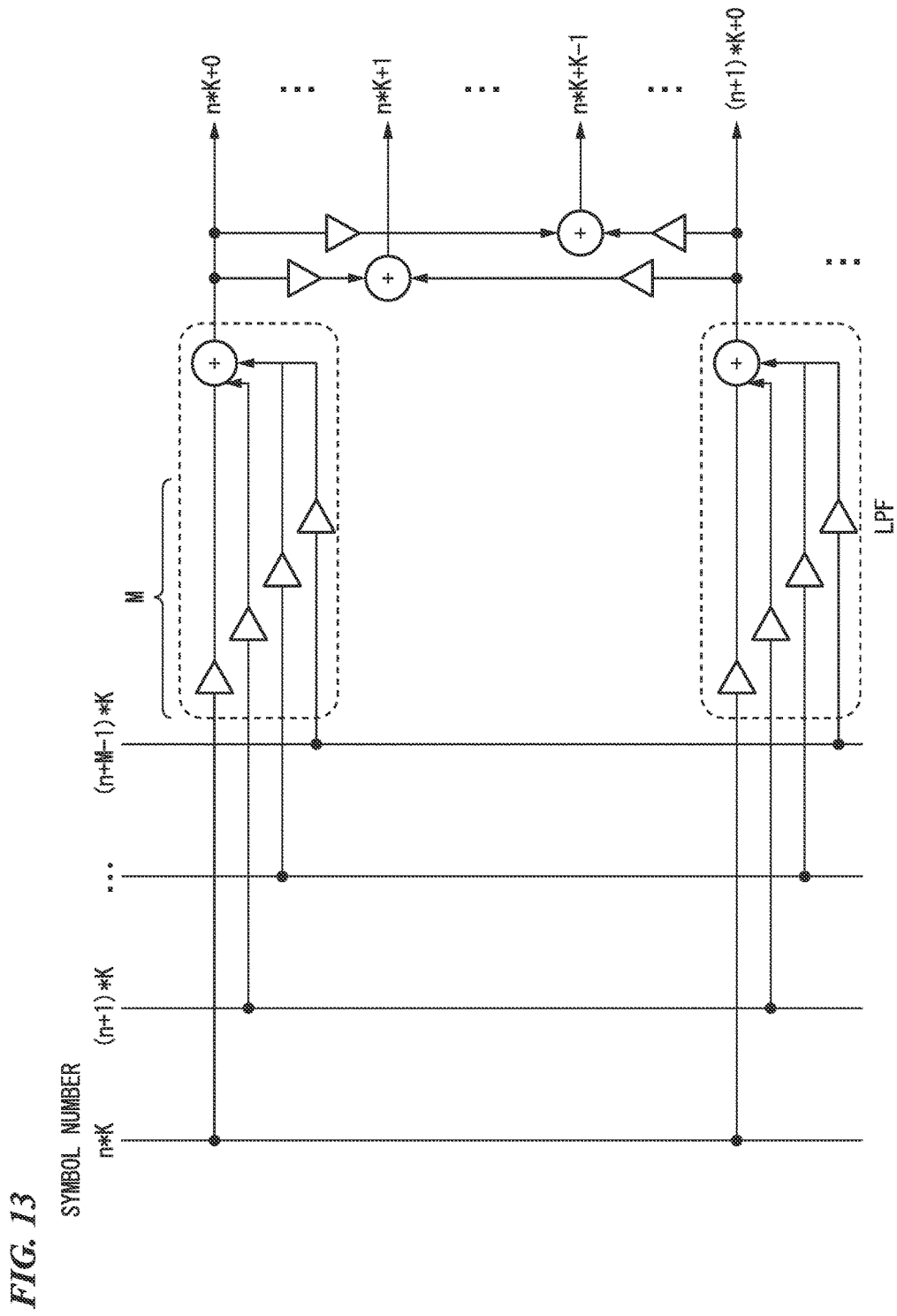
FIG. 13 is a block diagram illustrating an example of a configuration of a low pass filter 5443 in the second embodiment.

FIG. 13 is a block diagram illustrating an example of a configuration of the low pass filter 5443 in the present embodiment. In FIG. 13, K is an interval between pilot symbols. FIG. 13 shows an example in which the average value is calculated from M complex electric field error signals using a low pass filter having M taps, and phase noise of the data portion is calculated based on the calculated average value. When the cut-off frequency F [Hz] of the phase noise estimated using the pilot symbols is sufficiently smaller than 1/(2T) [Hz] that is a frequency of the phase noise that can be estimated from the pilot symbol, tap coefficients of a low pass filter used as the low pass filter 4444 in the first embodiment and tap coefficients of a low pass filter used as the low pass filter 5443 have substantially the same values. That is, by using the low pass filter as the averaging circuit like the low pass filter 5443 in the present embodiment, it is possible to reduce the circuit scale of the low pass filter to be 1/K, and improve interpolation accuracy of the phase noise in the data portion.

Figure 14:
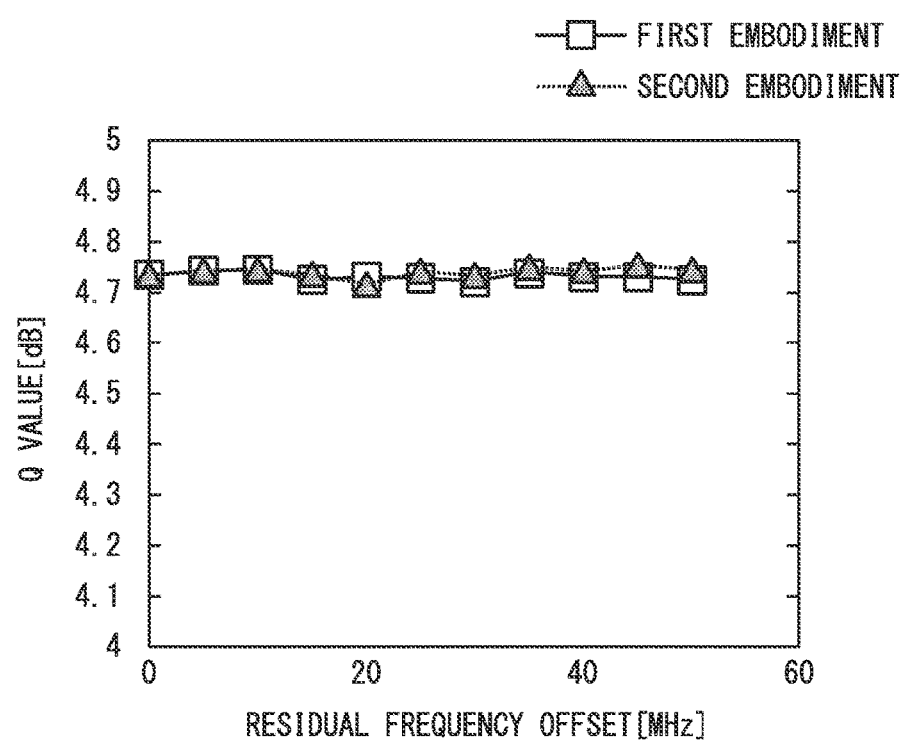
FIG. 14 is a graph showing communication quality (Q value) of the first embodiment and the second embodiment.

FIG. 14 is a graph showing the communication quality (Q value) of the first embodiment and the second embodiment. In FIG. 14, a horizontal axis indicates the residual frequency offset, and a vertical axis indicates the Q value. Even when the process is performed without performing the interpolation of the data portion as in the interpolation processing unit 5442 of the present embodiment, it is possible to obtain the same effects as in the first embodiment. The interpolation processing unit 5442 of the second embodiment can reduce the computational complexity and the circuit scale since the interpolation of the data portion is not performed and the configuration of the low pass filter can be simplified, as compared with the interpolation processing unit 4442 of the first embodiment.

It is to be noted that with respect to the configuration of the low pass filter used as the low pass filter 5443, the circuit scale of the low pass filter may be further reduced by determining a data portion to be linearly interpolated using the value of the complex electric field error signal and a data portion to be linearly interpolated using the output of the low pass filter from the viewpoint of the interpolation accuracy and the circuit scale in the linear interpolation processing unit 5444.

Third Embodiment

Figure 15:
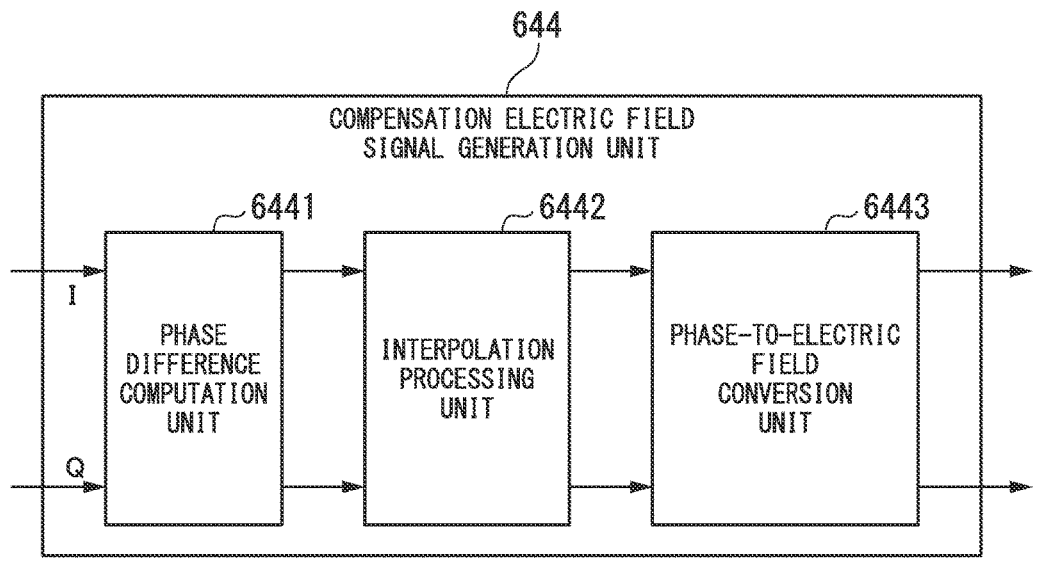
FIG. 15 is a block diagram illustrating a configuration of a compensation electric field signal generation unit 644 in a third embodiment.

A third embodiment describes a compensation electric field signal generation unit having a configuration different from those of the compensation electric field signal generation units in the first and second embodiments. FIG. 15 is a block diagram illustrating a configuration of a compensation electric field signal generation unit 644 in the third embodiment. The compensation electric field signal generation unit 644 includes a phase difference computation unit 6441, an interpolation processing unit 6442, and a phase-to-electric field conversion unit 6443. The complex electric field error signal calculated in the error signal computation unit 443 is input to the phase difference computation unit 6441. The phase difference computation unit 6441 calculates a phase component of the input complex electric field error signal. For calculation of the phase component in the phase difference operation unit 6441, for example, a lookup table in which a phase angle corresponding to a combination of the value of the in-phase component and the value of the quadrature component has been recorded is provided in advance, and the phase angle corresponding to the in-phase component and the quadrature component of the complex electric field error signal is read. Further, the phase angle may be calculated using Equation (2) below that is an approximation equation of a phase relationship when the phase is sufficiently small. It is to be noted that j is an imaginary unit.

[Equation 2]

$$\theta_{err} = j(1 - E_{err}/|E_{err}|) \qquad (2)$$

The phase difference computation unit 6441 performs an unwrapping process in order to achieve continuity between a phase angle calculated before one unit time and the calculated phase angle ($\theta_{err}$). In a general unwrapping process, conditional branching occurs so as to determine a size of the phase variation and remove indeterminacy of the phase. As a result, the circuit scale is increased. Here, when the phase variation to be compensated for is W [Hz], if ($2\pi$WT<<) 1 is satisfied, the difference (phase difference) between the phase of the complex electric field error signal before one unit time and the phase of the current complex electric field error signal is sufficiently small. In this case, the phase difference computation unit 6441 can be configured as illustrated in FIG. 16.

Figure 16:
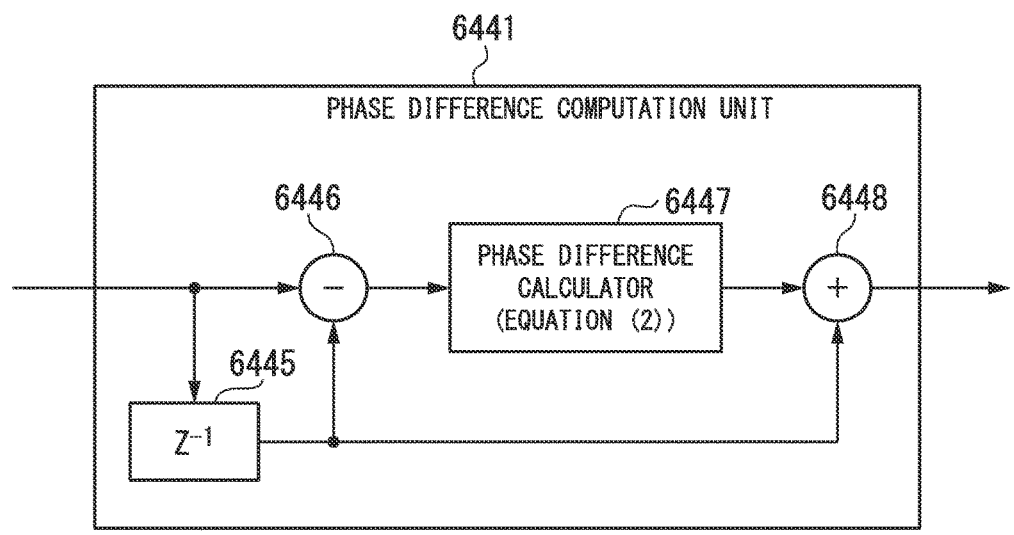
FIG. 16 is a block diagram illustrating an example of a configuration of a phase difference computation unit 6441 in the third embodiment.

FIG. 16 is a block diagram illustrating an example of a configuration of the phase difference computation unit 6441 in the present embodiment. The phase difference operation unit 6441 includes a delayer 6445, a subtractor 6446, a phase difference calculator 6447, and an adder 6448. The complex electric field error signal input to the phase difference computation unit 6441 is input to the delayer 6445 and the subtractor 6446. The delayer 6445 applies a delay corresponding to one unit time to the input complex electric field error signal and outputs the complex electric field error signal to the subtractor 6446 and the adder 6448. The subtractor 6446 subtracts the complex electric field error signal output by the delayer 6445 from the input complex electric field error signal, and outputs a subtraction result to the phase difference calculator 6447. The phase difference calculator 6447 receives the subtraction result output by the subtractor 6446 as $E_{err}$ and calculates a phase using Equation (2). The phase difference calculator 6447 outputs a complex signal indicating the calculated phase to the adder 6448. The adder 6448 adds the complex electric field error signal output by the delayer 6445 to the complex signal output by the phase difference calculator 6447, and outputs an addition result to the interpolation processing unit 6442. The phase difference computation unit 6441 can realize the calculation of the phase difference and the unwrapping process using the above configuration.

Referring back to FIG. 15, the configuration of the compensation electric field signal generation unit 644 will continue to be described.

The interpolation processing unit 6442 inserts, into a position of a symbol corresponding to the data portion, which is a symbol between complex electric field error signals corresponding to the positions of pilot symbols, zero or a value of the phase difference corresponding to the position of the pilot symbol near the position of the symbol. A signal of a symbol sequence obtained by inserting the zero or the phase difference into the symbol between the phase differences is input to the low pass filter, and the phase noise corresponding to the data portion is estimated. Alternatively, phase differences are input to the low pass filter, an average value of the phase differences is calculated, and the phase noise corresponding to the data portion is estimated through linear interpolation. That is, the interpolation processing unit 6442 performs the same process as the interpolation processing unit 4442 in the first embodiment or the interpolation processing unit 5442 in the second embodiment on the phase differences output by the phase difference computation unit 6441. The phase-to-electric field conversion unit 6443 converts the phase noise estimated by the interpolation processing unit 6442 into an in-phase complex signal having a unit amplitude (amplitude=1). In other words, when the phase noise is Θ, the phase-to-electric field conversion unit 6443 converts this phase noise into the complex signal (1×exp[jΘ]). The phase-to-electric field conversion unit 6443 outputs the complex signal obtained through the conversion to the phase compensation unit 445 as a compensation electric field signal.

As described above, in the optical transmission system, the transmission apparatus 1 intermittently inserts the pilot symbol, which is a known signal, into the data and performs transmission, and the reception apparatus 3 extracts the pilot symbol added by the transmission apparatus 1 from the received signal, estimates a phase variation occurring in the transmission apparatus 1, the optical fiber transmission path 2, and the reception apparatus 3 using the difference between the pilot symbol (reference symbol) before transmission and the pilot symbol after transmission, and performs phase compensation on the data. Thereby, it is possible to realize the establishment of the phase synchronization and improvement of communication quality with a simple circuit configuration.

It is to be noted that while the above embodiment describes the configuration in which the reception apparatus 3 includes the phase noise compensation unit, a relay apparatus or the like may include the phase noise compensation unit, or an apparatus that performs phase compensation in the optical transmission system may include the phase noise compensation unit.

Fourth Embodiment

A configuration of a compensation electric field signal generation unit different from the compensation electric field signal generation unit in the second embodiment will be described in a fourth embodiment. In the fourth embodiment, the normalization of the above-described phase noise sequence is performed using a decimation technique.

Figure 17:
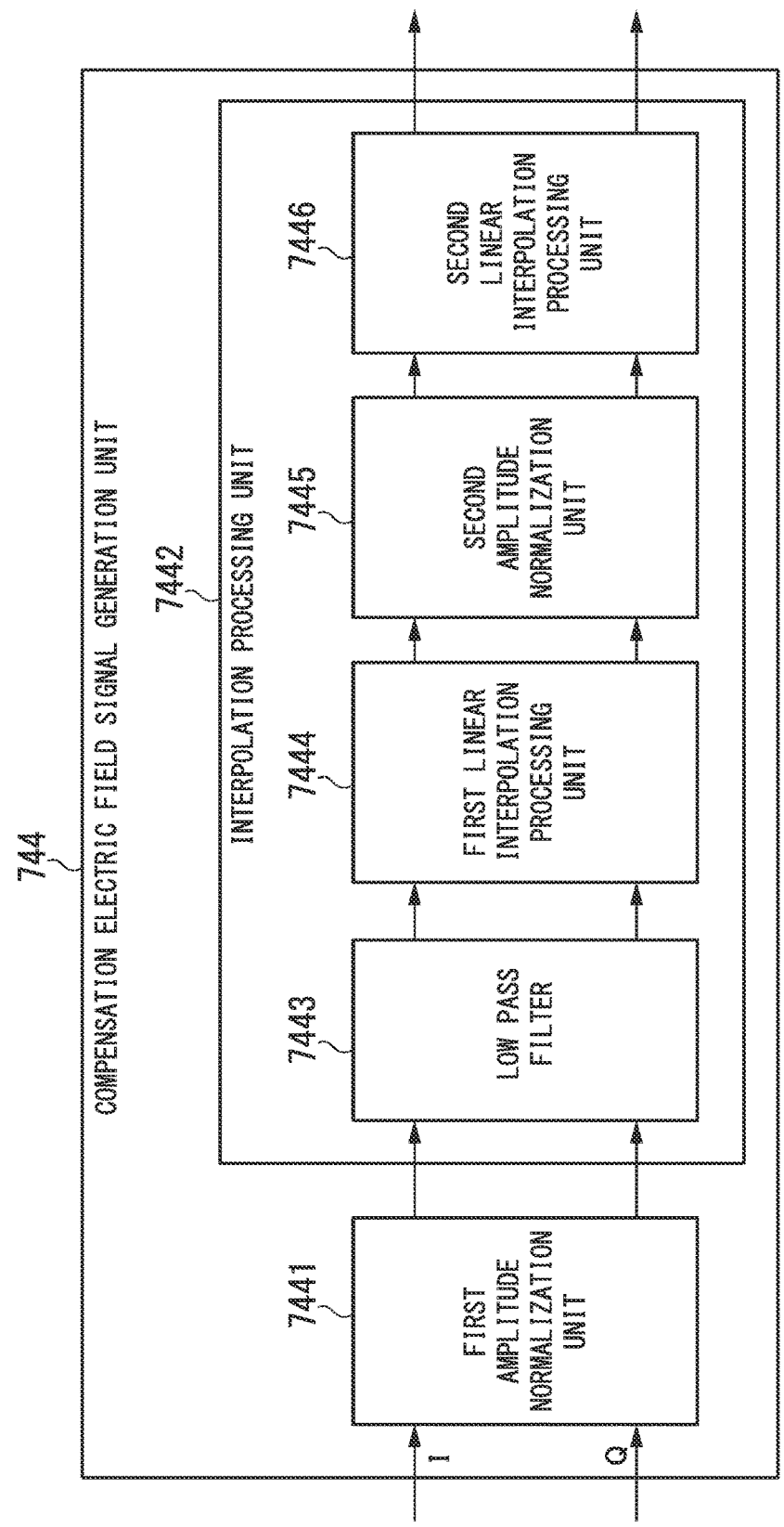
FIG. 17 is a block diagram illustrating a configuration of a compensation electric field signal generation unit in a fourth embodiment.

FIG. 17 is a block diagram illustrating a configuration of a compensation electric field signal generation unit 744 in present embodiment. The compensation electric field signal generation unit 744 includes a first amplitude normalization unit 7441, and an interpolation processing unit 7442. The interpolation processing unit 7442 includes a low pass filter 7443, a first linear interpolation processing unit 7444, a second amplitude normalization unit 7445, and a second linear interpolation processing unit 7446.

Figure 18:
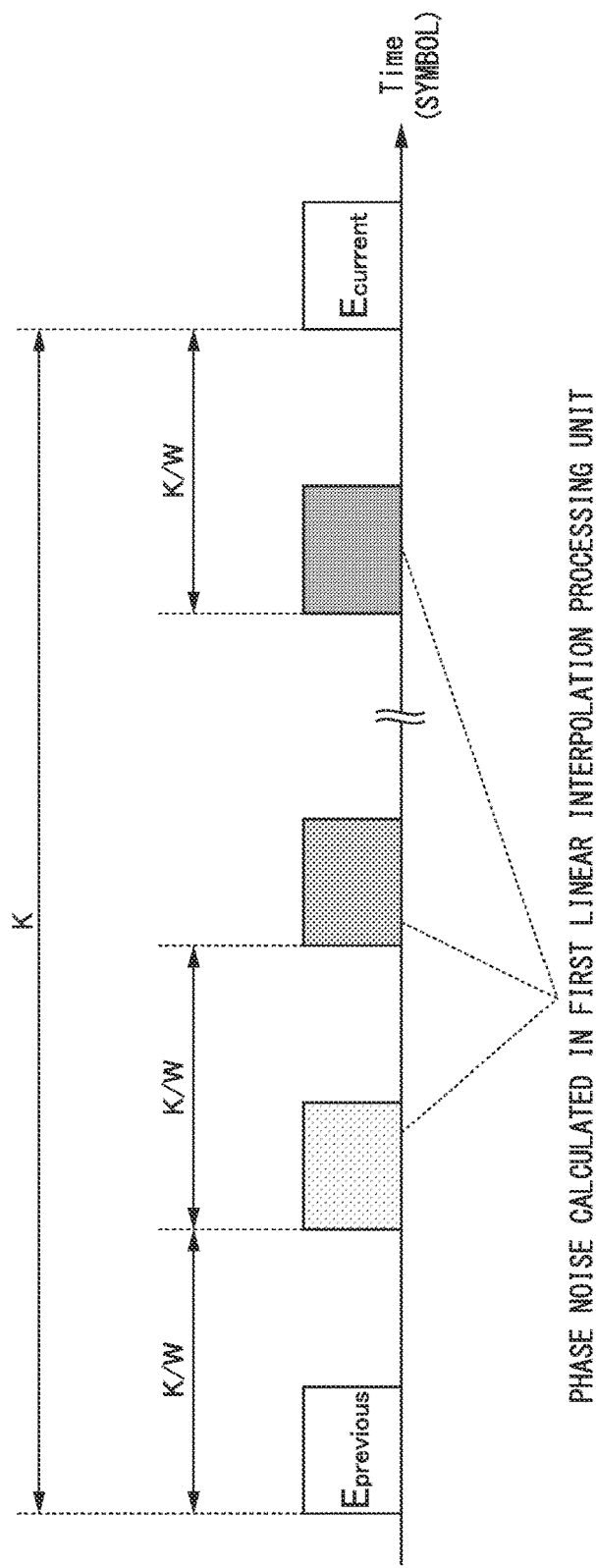
FIG. 18 is a diagram illustrating a position of phase noise calculated by a first linear interpolation processing unit of the fourth embodiment.

The first amplitude normalization unit 7441 and the low pass filter 7443 are the same as those in the second embodiment, and the averaged complex electric field error signal is output from the low pass filter 7443. The first linear interpolation processing unit 7444 divides a section of a symbol interval K between the averaged complex electric field error signal (hereinafter referred to as $E_{current}$) and a complex electric field error signal (hereinafter referred to as $E_{previous}$) output from the low pass filter 7443 immediately before $E_{current}$ into sections of K/W symbols, and calculates phase noises of data portion located at boundaries between the sections through linear interpolation using $E_{previous}$ and $E_{current}$. FIG. 18 illustrates positions of the calculated phase noises. In FIG. 18, a horizontal axis indicates time (symbol).

Each of amplitudes of complex signals indicating the calculated phase noises, $E_{previous}$, and $E_{current}$ is normalized in the second amplitude normalization unit 7445. The second linear interpolation processing unit 7446 calculates phase noises of the data portion located within the section through linear interpolation using the normalized $E_{previous}$, $E_{current}$, and phase noises.

Figure 19A:
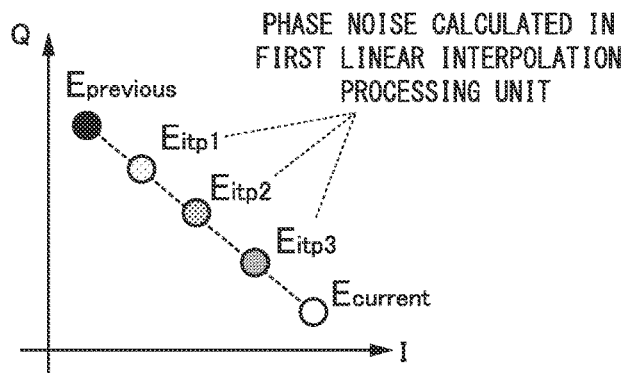
FIG. 19A is a diagram illustrating a process of the first linear interpolation processing unit in the fourth embodiment.
Figure 19B:
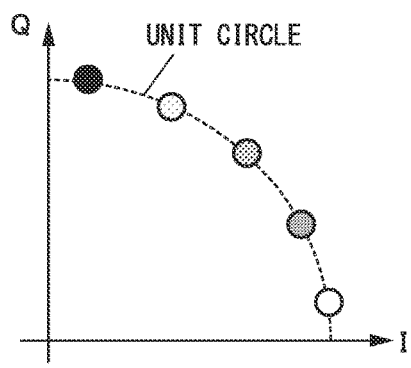
FIG. 19B is a diagram illustrating a process of a second amplitude normalization unit in the fourth embodiment.
Figure 19C:
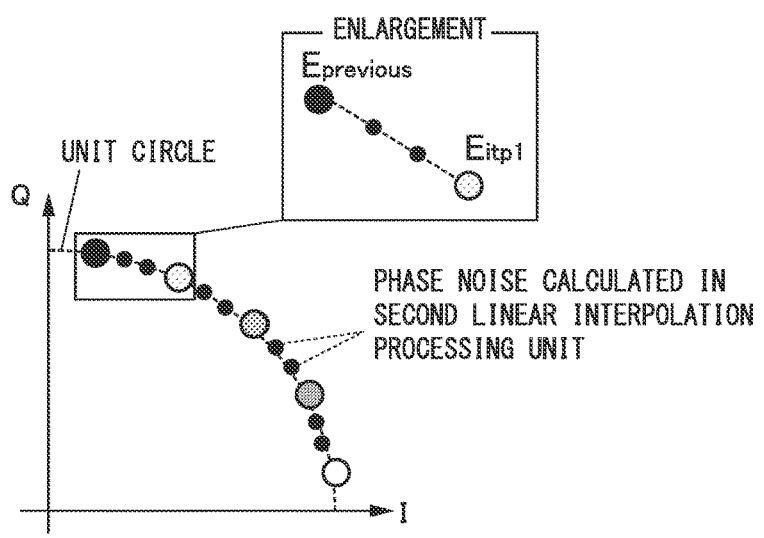
FIG. 19C is a diagram illustrating a processing of a second linear interpolation processing unit in the fourth embodiment.

Hereinafter, W=4 is assumed and details of the processes of the first linear interpolation processing unit 7444, the second amplitude normalization unit 7445, and the second linear interpolation processing unit 7446 will be described with reference to FIGS. 19A to 19C. In FIG. 19A, $E_{itp1}$, $E_{itp2}$, and $E_{itp3}$ are phase noises of the data portion located on the boundaries of the sections divided every K/4 symbols. $E_{itp1}$, $E_{itp2}$, and $E_{itp3}$ are calculated in accordance with, for example, Equation (3), Equation (4), and Equation (5) in the first linear interpolation processing unit 7444.

[Equation 3]

$$E_{itp1} = E_{previous} + \left(\left\lfloor \frac{K}{4} \right\rfloor \times \frac{1}{K}\right)(E_{current} - E_{previous}) \quad (3)$$

⌊ ⌋ is a floor function

[Equation 4]

$$E_{itp2} = E_{previous} + \left(\left\lfloor \frac{2K}{4} \right\rfloor \times \frac{1}{K}\right)(E_{current} - E_{previous}) \quad (4)$$

⌊ ⌋ is a floor function

[Equation 5]

$$E_{itp3} = E_{previous} + \left(\left\lfloor \frac{3K}{4} \right\rfloor \times \frac{1}{K}\right)(E_{current} - E_{previous}) \quad (5)$$

⌊ ⌋ is a floor function

Here, a section from $E_{previous}$ to $E_{itp1}$ is referred to as a first section, a section from $E_{itp1}$ to $E_{itp2}$ is referred to as a second section, a section from $E_{itp2}$ to $E_{itp3}$ is referred to as a third section, and a section from $E_{itp3}$ to $E_{current}$ is referred to as a fourth section. Each of $E_{itp1}$, $E_{itp2}$, $E_{itp3}$, $E_{previous}$, and $E_{current}$, which are boundary points of the sections, is normalized in the second amplitude normalization unit 7445. The normalized $E_{itp1}$, $E_{itp2}$, $E_{itp3}$, $E_{previous}$, and $E_{current}$ exist on a unit circle in the complex plane, as illustrated in FIG. 19B. The second linear interpolation processing unit 7446 calculates the phase noise of the data portion in the first section through linear interpolation using the normalized $E_{previous}$ and $E_{itp1}$. The same applies to calculation of the phase noises of the data portion in the second to fourth sections, and the phase noises of the data portion in the second to fourth sections is calculated through linear interpolation using the boundary points of the sections after normalization. Thereby, values of the phase noises of the data portion in the sections approximate to the unit circle in the complex plane, as illustrated in FIG. 19C. That is, the averaged complex electric field error signal and the phase noise sequence including the phase noises of the data portion approximately exist on the unit circle, and the same effects as those in the second embodiment in which the entire phase noise sequence is normalized can be obtained. Further, since the phase noise sequence to be normalized is reduced to (W+1)/K as compared to the second embodiment, it is possible to reduce the circuit scale of the second amplitude normalization unit 7445 to (W+1)/K.

Fifth Embodiment

Figure 20:
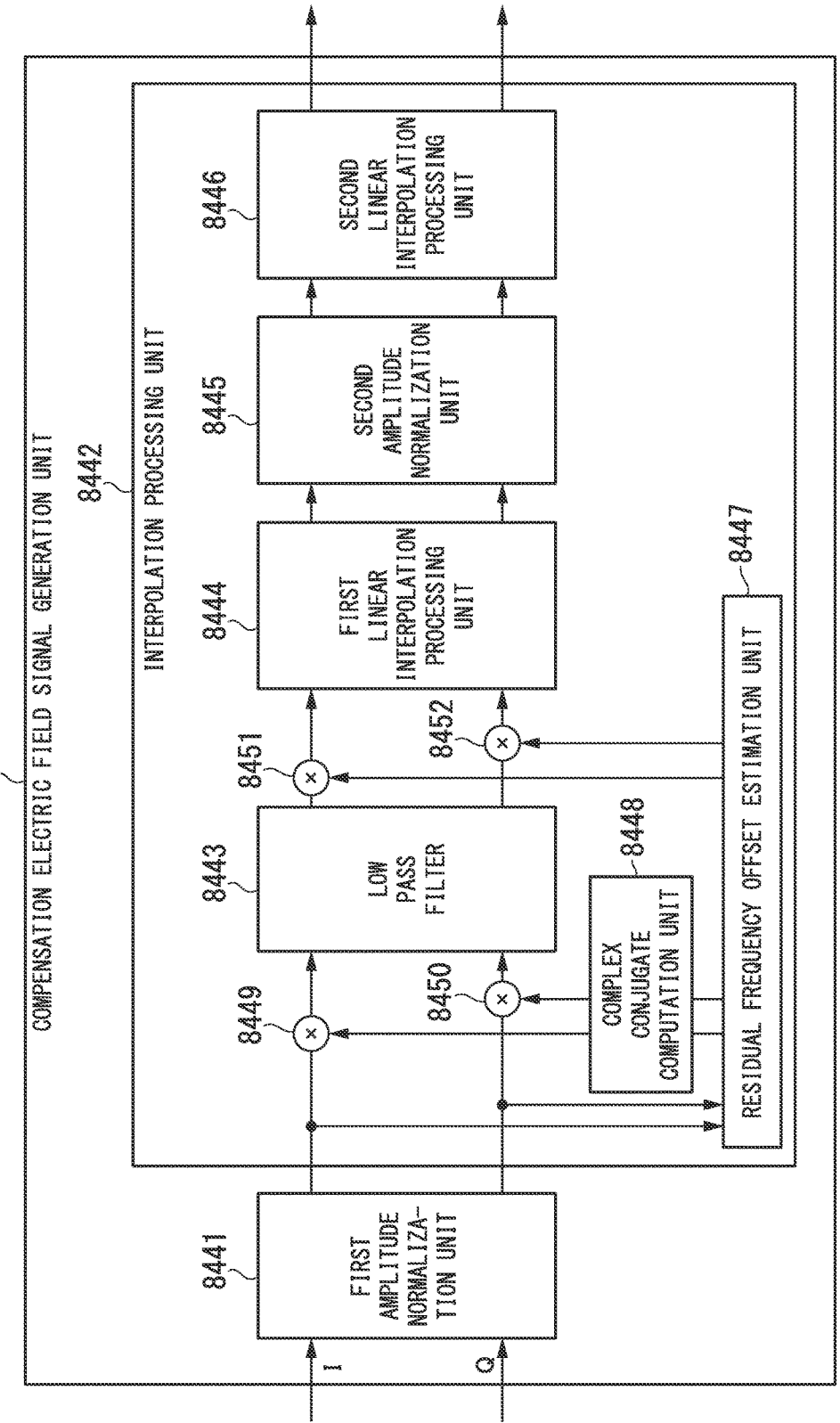
FIG. 20 is a block diagram illustrating a configuration of a compensation electric field signal generation unit in a fifth embodiment.

A configuration of an interpolation processing unit different from the interpolation processing unit in the fourth embodiment will be described in a fifth embodiment. FIG. 20 is a block diagram illustrating a configuration of a compensation electric field signal generation unit 844 in present embodiment. The compensation electric field signal generation unit 844 includes a first amplitude normalization unit 8441 and an interpolation processing unit 8442. The interpolation processing unit 8442 includes a low pass filter 8443, a first linear interpolation processing unit 8444, a second amplitude normalization unit 8445, a second linear interpolation processing unit 8446, a residual frequency offset estimation unit 8447, a complex conjugate computation unit 8448, and multipliers 8449 to 8452 (computation units). The first amplitude normalization unit 8441, the low pass filter 8443, the first linear interpolation processing unit 8444, the second amplitude normalization unit 8445, and the second linear interpolation processing unit 8446 have the same configurations as corresponding structural components in the compensation electric field signal generation unit 744 illustrated in FIG. 17.

In the interpolation processing unit 8442 of the fifth embodiment, the residual frequency offset estimation unit 8447 estimates the residual frequency offset from the complex electric field error signal output by the first amplitude normalization unit 8441, as illustrated in FIG. 20. With this configuration, it is possible to separately estimate the residual frequency offset and the phase noise, to improve accuracy of the estimation, and to design a bandwidth of the low pass filter 8443 in consideration of a variation band of the phase noise.

Figure 21:
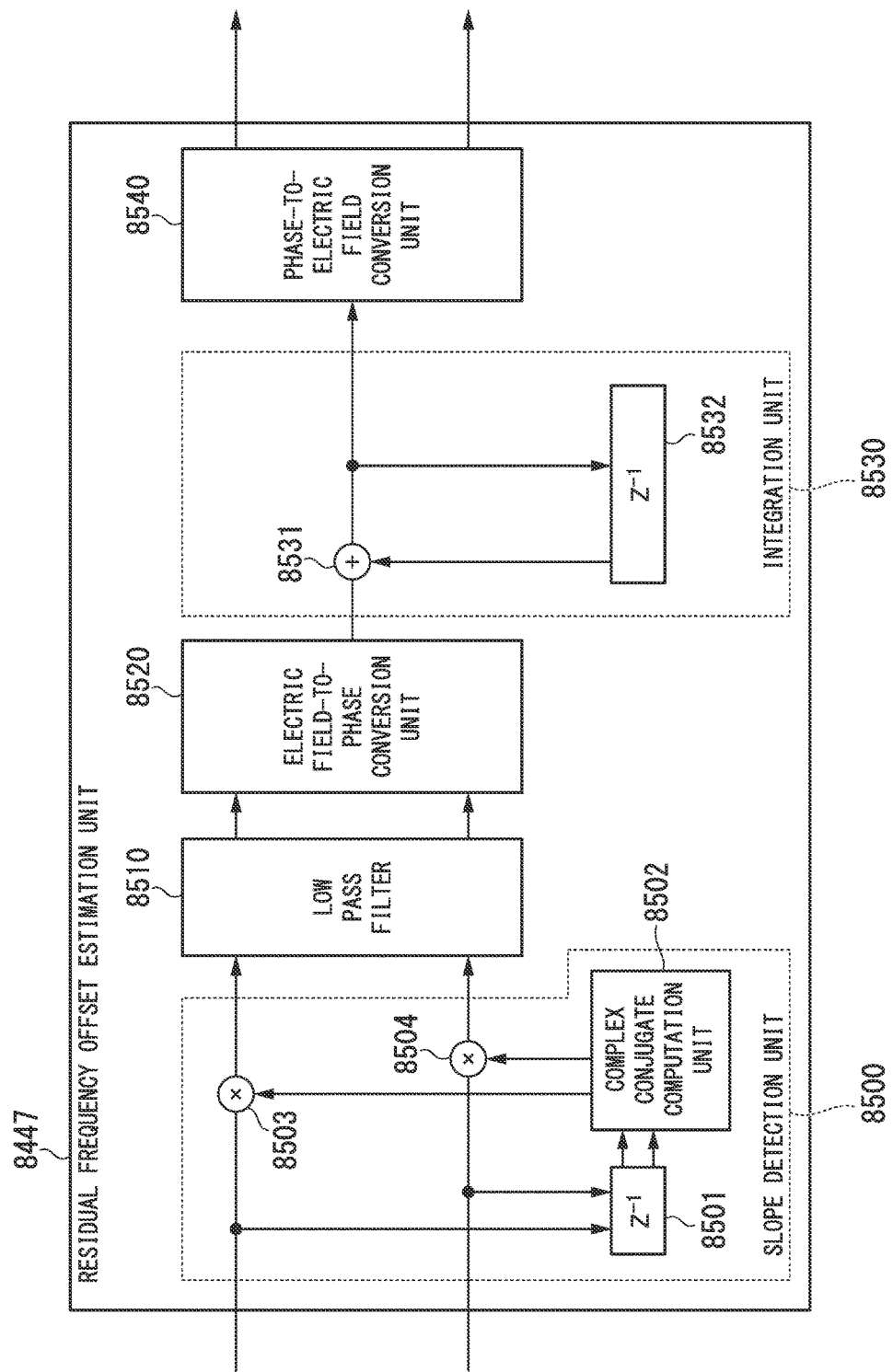
FIG. 21 is a block diagram illustrating an example of a configuration of a residual frequency offset estimation unit in the fifth embodiment.

FIG. 21 illustrates an example of a configuration of the residual frequency offset estimation unit 8447. It is to be noted that it is only necessary for the residual frequency offset estimation unit 8447 to estimate the residual frequency offset from the complex electric field error signal output by the first amplitude normalization unit 8441, and the residual frequency offset estimation unit 8447 may have, for example, a high-order phase locked loop (PLL) type configuration (not illustrated).

Hereinafter, details of the residual frequency offset estimation unit 8447 will be described with reference to FIG. 21. FIG. 21 is a block diagram illustrating the configuration of the residual frequency offset estimation unit 8447. The residual frequency offset estimation unit 8447 includes a slope detection unit 8500 (phase slope detection unit), a low pass filter 8510, an electric field-to-phase conversion unit 8520, an integration unit 8530, and a phase-to-electric field conversion unit 8540. The slope detection unit 8500 includes a delayer 8501, a complex conjugate computation unit 8502, a multiplier 8503, and a multiplier 8504. The integration unit 8530 includes an adder 8531, and a delayer 8532.

The slope detection unit 8500 in FIG. 21 calculates an instantaneous value of the residual frequency offset. The complex electric field error signal input to the slope detection unit 8500 is supplied to the delayer 8501, the multiplier 8503, and the multiplier 8504. The delayer 8501 applies a delay corresponding to one unit time to the input complex electric field error signal and outputs the delayed complex electric field error signal to the complex conjugate computation unit 8502. The complex conjugate computation unit 8502 calculates a complex conjugate value of the input complex electric field error signal and outputs the calculated complex conjugate value to the multiplier 8503 and the multiplier 8504.

The multipliers 8503 and 8504 multiply the normalized complex electric field error signal input from the first amplitude normalization unit 8441 (FIG. 20) by the complex conjugate value of an immediately previous complex electric field error signal output from the complex conjugate computation unit 8502 to calculate an amount of a variation of the complex electric field in a pilot symbol interval T [sec]. The calculated amounts of the variation of the complex electric field are input to the low pass filter 8510 and averaged. A bandwidth of the low pass filter 8510 can be designed based on a time-varying bandwidth of the residual frequency offset and a noise level included in the complex electric field error signal.

Subsequently, the electric field-to-phase conversion unit 8520 converts the complex electric field value output from the low pass filter 8510 into a phase value [rad]. With the electric field-to-phase conversion unit 8520, it is possible to mitigate computational degradation of the integration unit 8530 to be described below. The converted phase value is input to the integration unit 8530. In the integration unit 8530, in order to perform integration of the phase value, the adder 8531 adds the output of the electric field-to-phase conversion unit 8520 to an immediately previous output of the integration unit 8530 which is output from the delayer 8532. With the integration unit 8530, it is possible to guarantee continuity of the phase change of the residual frequency offset to be estimated. In this case, in consideration of accuracy of a computation in the integration unit 8530, the output of the electric field-to-phase conversion unit 8520 may be processed in a $2\pi$ [rad] modulo computation unit (not illustrated), and an output of the integration unit 8530 may be limited within a range from $-\pi$ to $+\pi$ (or, from 0 to $+2\pi$). Subsequently, the integration value output from the integration unit 8530 is input to the phase-to-electric field conversion unit 8540 as a phase value, and conversion into the complex electric field value is performed again. That is, the phase-to-electric field conversion unit 8540 converts the output of the integration unit 8530 into the complex electric field error signal that is a format for input to the first linear interpolation processing unit 8444 of the interpolation processing unit 8442.

Referring back to FIG. 20, the configuration of the compensation electric field signal generation unit 844 will continue to be described. The complex electric field error signal output from the residual frequency offset estimation unit 8447 is converted into a complex conjugate value by the complex conjugate computation unit 8448. The multiplier 8449 and the multiplier 8450 multiply the normalized complex electric field error signal output from the first amplitude normalization unit 8441 by the converted complex conjugate value, and input multiplication results to the low pass filter 8443. Through this multiplication, a residual frequency offset component is removed from the complex electric field error signal that is input to the low pass filter 8443. Since the complex electric field residual error signal from which the residual frequency offset component has been removed includes only a phase noise component, the bandwidth of the low pass filter 8443 of a subsequent stage is set to a bandwidth of the phase noise component. Since the outputs of the low pass filter 8443 are only phase noise estimation values, the multiplier 8451 and the multiplier 8452 multiply the outputs of the low pass filter 8443 by the output results of the residual frequency offset estimation unit 8447 to generate a complex electric field error signal including the residual frequency offset component and the phase noise component. The generated complex electric field error signal is input to the first linear interpolation processing unit 8444. Thereafter, the same process as in the fourth embodiment is performed.

Sixth Embodiment

Figure 22:
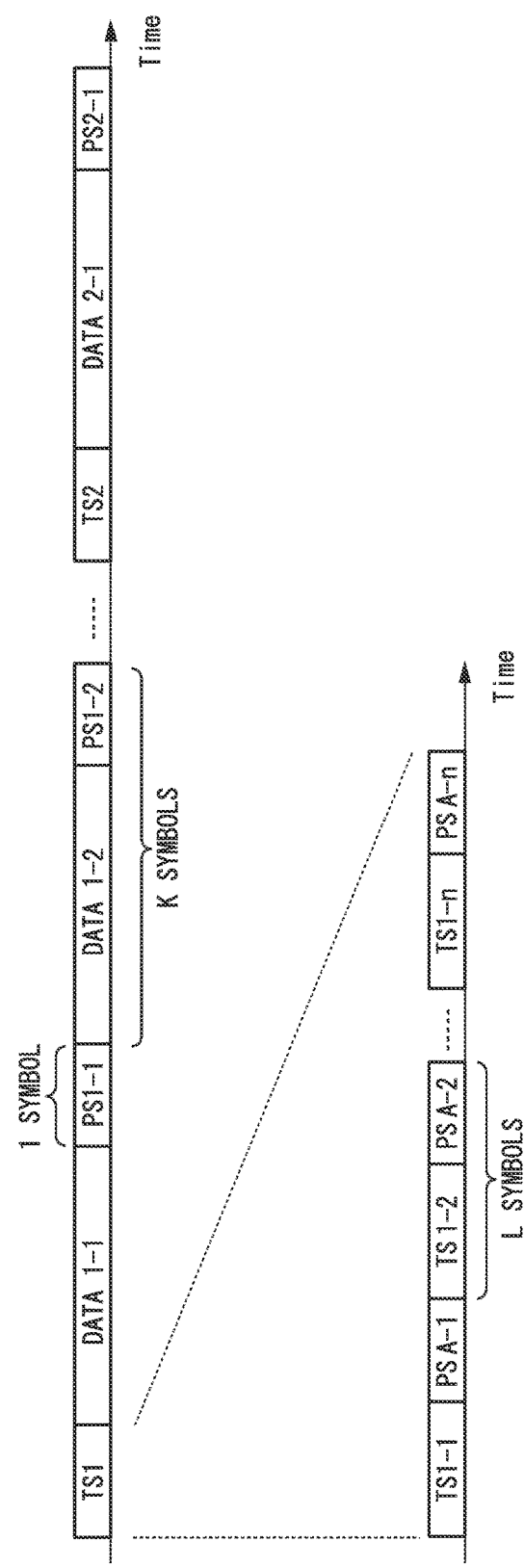
FIG. 22 is a diagram illustrating a frame structure of transmission/reception frames in a sixth embodiment.

A frame structure and a residual frequency offset estimation unit different from those in the fifth embodiment will be described in a sixth embodiment. FIG. 22 illustrates a frame structure of transmission/reception frames in the sixth embodiment. It is to be noted that, in FIG. 22, the same signals as those illustrated in FIG. 3 are denoted with the same reference signs.

Figure 23:
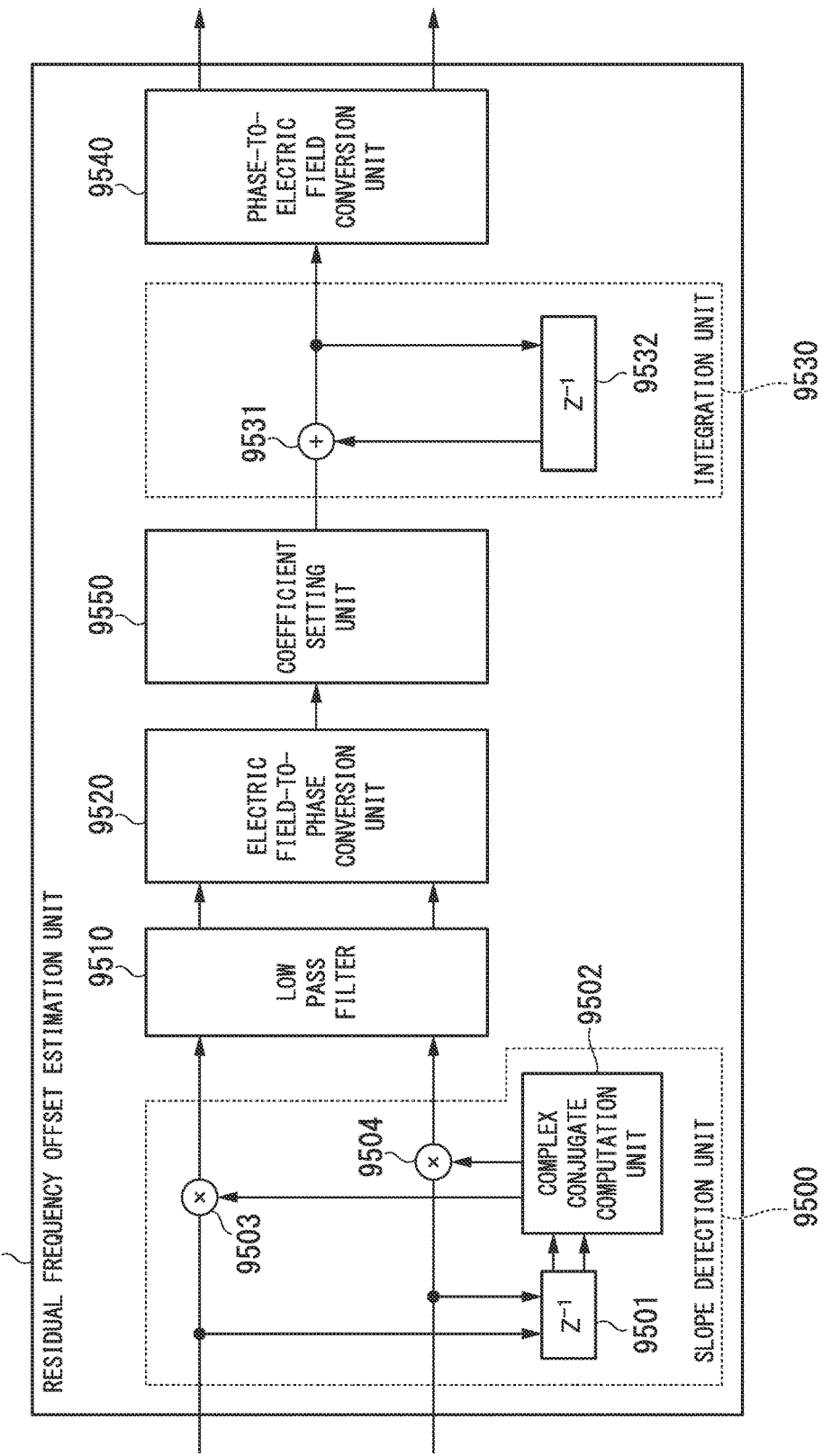
FIG. 23 is a block diagram illustrating a configuration of a residual frequency offset estimation unit in accordance with the sixth embodiment.

Further, FIG. 23 is a block diagram illustrating a configuration of a residual frequency offset estimation unit 9447 in the present embodiment. The residual frequency offset estimation unit 9447 includes a slope detection unit 9500, a low pass filter 9510, an electric field-to-phase conversion unit 9520, an integration unit 9530, a phase-to-electric field conversion unit 9540, and a coefficient setting unit 9550. The slope detection unit 9500 includes a delayer 9501, a complex conjugate computation unit 9502, a multiplier 9503, and a multiplier 9504. The integration unit 9530 includes an adder 9531, and a delayer 9532. In the residual frequency offset estimation unit 9447, structural components other than the coefficient setting unit 9550 have the same configurations as the corresponding structural components in the residual frequency offset estimation unit 8447 illustrated in FIG. 21.

As illustrated in FIG. 22, a synchronization pattern (for example, synchronization pattern TS1) including consecutive symbols, which has the above frame structure, includes pilot symbols. The pilot symbol having a symbol length of 1 is inserted into the synchronization pattern (PSA-1, PSA-2, ..., PSA-n in FIG. 22) every L symbols. Also, the pilot symbol detection unit 441 illustrated in FIG. 5 detects the pilot symbols included in the synchronization pattern and the pilot symbols included in the data. Further, the pilot symbol extraction units 4413 and 4414 in FIG. 6 extract the pilot symbols included in the synchronization pattern and the pilot symbols included in the data.

The extracted pilot symbols are input to the compensation electric field signal generation unit 844 in FIG. 20 and are normalized by the first amplitude normalization unit 8441. The normalized complex electric field error signal is input to the interpolation processing unit 8442 of FIG. 20. In the sixth embodiment, the residual frequency offset estimation unit 9447 illustrated in FIG. 23 includes the coefficient setting unit 9550. Here, a method for estimating the residual frequency offset using only the pilot symbols included in the data will be described. When the residual frequency offset is $\Delta\omega$ [Hz] and the output of the electric field-to-phase conversion unit 9520 with respect to the complex electric field error signal using the pilot symbols included in the data is $\phi(n)$ [rad], a relationship with $\Delta\omega$ is as shown in Equation (6). However, it is assumed that an insertion interval of the pilot symbol in a data section is T [sec], and the pilot symbol is inserted every K symbols.

[Equation 6]

$$\Delta\omega T = \phi(n) \quad (6)$$

In contrast, it is necessary for an output $\psi(n)$ of the electric field-to-phase conversion unit 9520 with respect to the synchronization pattern to satisfy Equation (7) since the residual frequency offset estimated using the pilot symbols included in the data is converted into the residual frequency offset for the synchronization pattern.

[Equation 7]

$$\Delta\omega T \times \frac{L}{K} = \psi(n) \quad (7)$$

Thus, the relationship between $\phi(n)$ and $\psi(n)$ is as shown in Equation (8).

[Equation 8]

$$\psi(n) = \frac{L}{K}\phi(n) \quad (8)$$

That is, an estimation value of the residual frequency offset for the synchronization pattern is obtained by the coefficient setting unit 9550 illustrated in FIG. 23 outputting a value of L/K times the output $\phi(n)$ of the electric field-to-phase conversion unit 9520 with respect to the complex electric field error signal using the pilot symbols included in the data.

Thereby, even when a frame having a structure including pilot symbols in which an insertion interval of a pilot symbol included in the synchronization pattern is different from an insertion interval of a pilot symbol in the data section is input to the phase noise compensation unit 44 illustrated in FIG. 4, the residual frequency offset can be compensated for with respect to the data section and the synchronization pattern.

Seventh Embodiment

A configuration for mapping on the complex plane of the synchronization pattern will be described in a seventh embodiment.

As the synchronization pattern, any pattern may be used as long as a peak of correlation can be detected when the reception apparatus 3 in FIG. 1 detects the synchronization pattern in a reception digital signal. As an example of a pattern used as the synchronization pattern, a pseudo random bit sequence (PRBS) having a correlation only when the delay is zero can be used. The PRBS has a sharp correlation only when the delay is zero. It is to be noted that the same applies even when the PRBS is replaced with a PN sequence or an M sequence.

Figure 24:
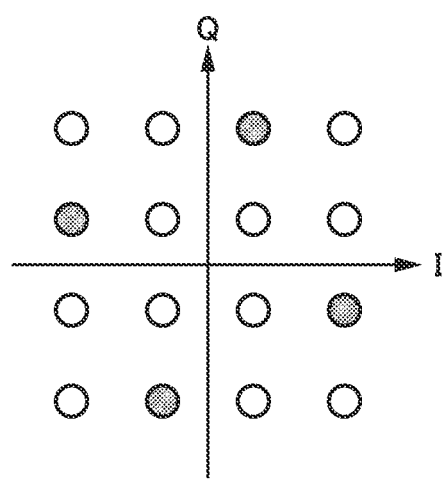
FIG. 24 illustrates an example of mapping on a complex plane of a pilot symbol by a symbol mapping unit 123 in a seventh embodiment.

FIG. 24 shows an example of mapping on the complex plane of the synchronization pattern in the symbol mapping unit 123 in FIG. 2. The symbols illustrated in FIG. 24 are symbols when 16QAM (QAM: quadrature amplitude modulation) is adopted as a modulation scheme. When mapping the synchronization pattern, the symbol mapping unit 123 maps the synchronization pattern to black symbols (•) among 16 symbols illustrated in FIG. 24. This is intended to prevent more excessive phase noise than a data signal due to noise or waveform distortion during transmission from being applied to the synchronization pattern. Examples of causes of the phase noise generated during transmission include self-phase modulation (SPM) and cross phase modulation (XPM), which are nonlinear optical effects, and a frequency offset caused when a frequency of a local oscillator (LO) is shifted from a carrier frequency of a signal.

It is to be noted that when a modulation scheme in which an amplitude level has three or more values is used instead of the mapping example illustrated in FIG. 24, it is preferable for a symbol having an amplitude other than the maximum amplitude and minimum amplitude to be used for mapping the synchronization pattern. This is because in the symbol having the minimum amplitude, an error is easily generated due to the influence of the noise, and in the symbol having the maximum amplitude, an error is easily generated due to the influence of nonlinear optical effects. Further, when the amplitude values is binary, it is preferable for a symbol having an amplitude value in which a possibility of generation of an error is low to be used. However, in an optical fiber transmission path in which the nonlinear optical effects are small, a symbol having the maximum amplitude value may be used.

Figure 25:
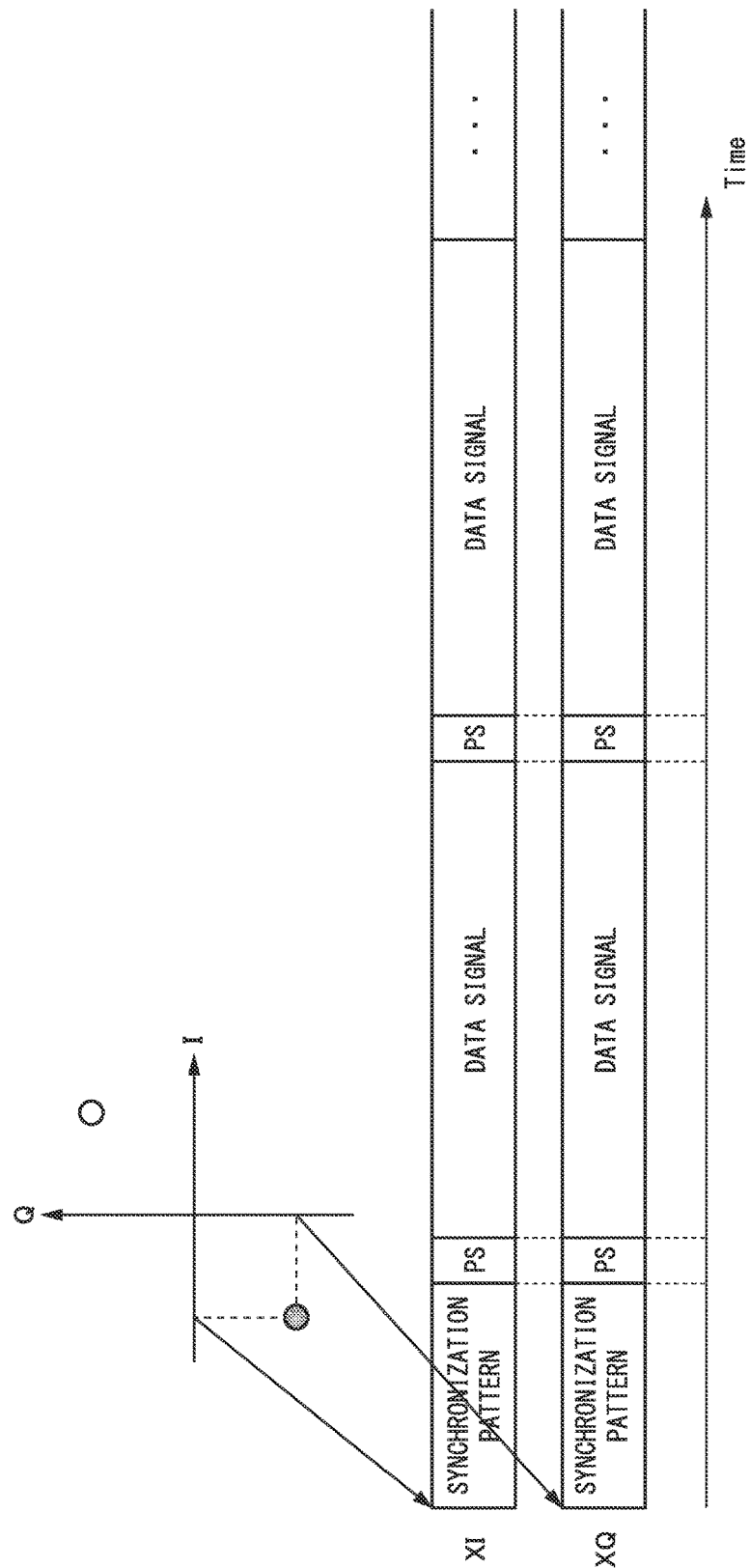
FIG. 25 illustrates an example of a configuration of a transmission/reception frame having synchronization patterns in which mapping is performed on the same complex plane in the seventh embodiment.

FIG. 25 is a diagram illustrating an example of a structure of transmission/reception frames including synchronization patterns on which mapping is performed on the same complex plane. Binary phase shift keying (BPSK) in which a phase margin is ±90° and an error is not easily generated is used as a modulation scheme for the synchronization pattern.

The symbol mapping unit 123 in FIG. 2 recognizes a position of the pilot symbol inserted by the pilot symbol insertion unit 121 and a position of the synchronization pattern inserted by the synchronization pattern insertion unit 122, and selects a symbol to be mapped in accordance with whether a mapping target is the pilot symbol, the synchronization pattern, or the data signal. For example, when the synchronization pattern is mapped when 64QAM is used as the modulation scheme, the symbol mapping unit 123 selects two symbols from 64 symbols so that a mapping result to the selected symbol forms a pattern of PRBS. Further, six times a bit pattern obtained as the PRBS may be obtained and mapping may be performed using 64QAM.

For the calculation of the correlation in the synchronization pattern detection unit 4412 in FIG. 6, for example, a convolution circuit that performs a convolution computation can be used. In this case, inputs to the convolution circuit are a reception digital signal and a known synchronization pattern. Further, the reception digital signal may be binary identified and a time position may be detected by identifying a time position in which the digital pattern and the synchronization pattern substantially match. Accordingly, it is possible to reduce the circuit scale of the synchronization pattern detection unit 4412.

Further, a differential detection and an exclusive OR computation can also be used instead of the convolution computation. By using the differential detection, it is possible to remove a steady frequency offset component. For example, when the phases of the synchronization pattern are $\{\theta(1), \theta(2), \ldots, \theta(N)\}$, the differential detection components $\Delta\theta(n)$ are $\Delta\theta(n)=\theta(n+1)-\theta(n)$ ($n=1, 2, \ldots, N-1$). If the frequency offset $\Delta\theta N(n)$ ($n=1, 2, \ldots, N$) are generated when synchronization is performed using the differential detection components of $\Delta\theta$, phase rotation is added to the synchronization pattern.

The phases of the synchronization pattern when the frequency offsets are generated are expressed as $\{(\theta(1)+\Delta\theta N(1)), (\theta(2)+\Delta\theta N(2)), \ldots, (\theta(N)+\Delta\theta N(N))\}$. In this case, differential detection components $\Delta\theta(n)$ are as follows.

$$\Delta\theta(n) = (\theta(n+1) + \Delta\theta N(n+1)) - (\theta(n) + \Delta\theta N(n))$$
$$= \Delta\theta(n) + (\Delta\theta N(n+1) - \Delta\theta N(n)), (n = 1, 2, \ldots, N-1)$$

When the frequency offset component is sufficiently slower than a sampling frequency of the reception digital signal, $\Delta\theta N(n+1)-\Delta\theta N(n)$ is in a range from $-\pi$ to $+\pi$, and when a time variation of the frequency offset is small, $\Delta\theta N(n+1)-\Delta\theta N(n)$ is a substantially constant value and can be removed. Thus, a differential detection component does not have a phase rotation component caused by the frequency offset, and only components $\Delta\theta(1), \ldots, \Delta\theta(N-1)$ can be extracted.

Thereby, it is possible to establish synchronization by suppressing the influence of the frequency offset.

Figure 26:
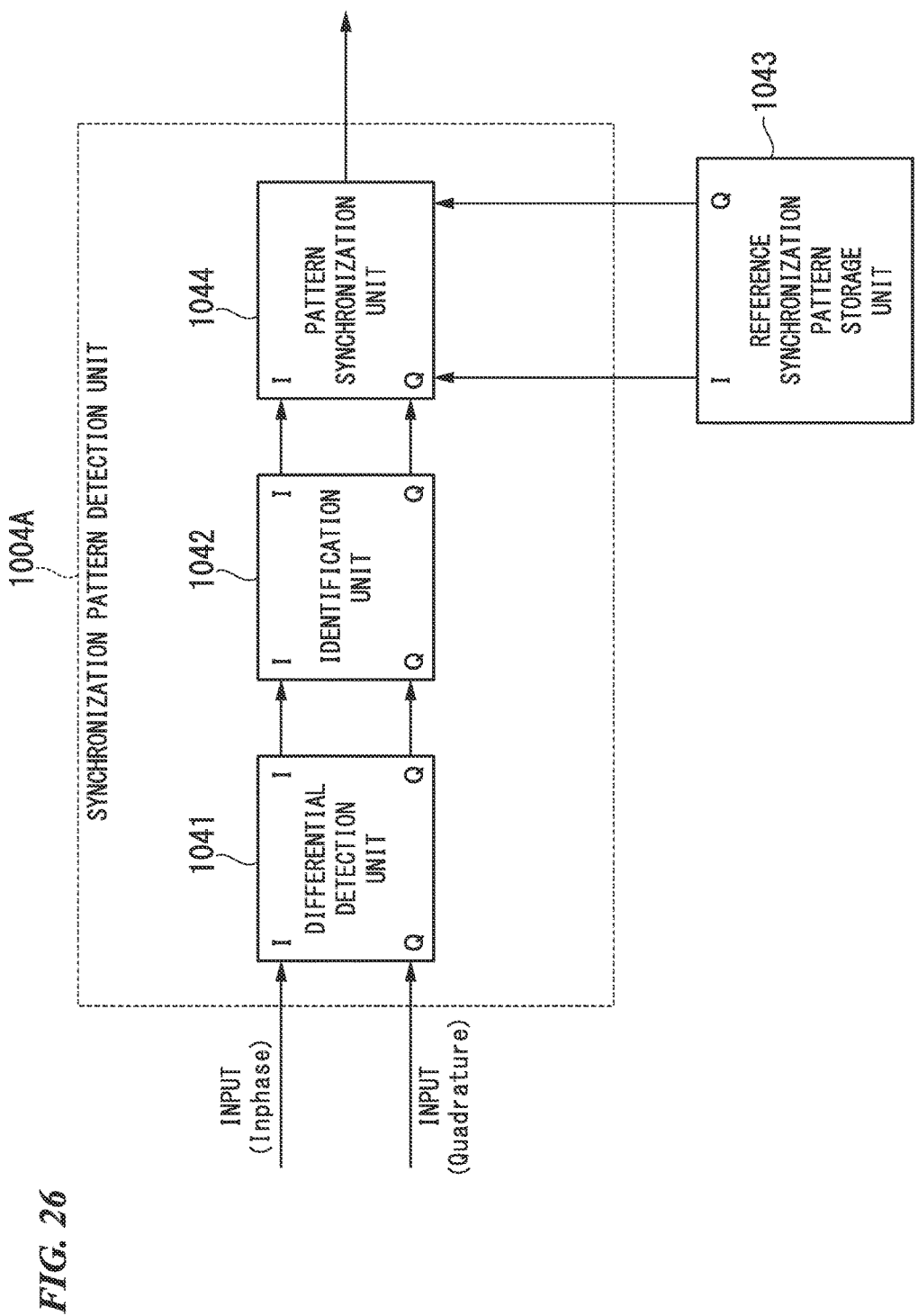
FIG. 26 is a block diagram illustrating an example of a configuration of a synchronization pattern synchronization unit 1004A in the seventh embodiment.

FIG. 26 is a block diagram illustrating an example of a configuration of the synchronization pattern detection unit 1004A at the time of differential detection. Here, a configuration in which phase information is used as the synchronization pattern, and a modulation scheme in which one symbol includes information of two or more bits is used will be described. An example of the modulation scheme in this case includes a quadrature phase shift keying (QPSK) modulation. The synchronization pattern detection unit 1004A includes a differential detection unit 1041, an identification unit 1042, and a pattern synchronization unit 1044. Further, a reference synchronization pattern storage unit 1043 corresponding to the reference synchronization pattern storage unit 4411 illustrated in FIG. 6 is connected to the synchronization pattern detection unit 1004A.

The I signal component and the Q signal component that are signals corresponding to a horizontal axis (in-phase component) and a vertical axis (quadrature component) on the complex plane are input to the differential detection unit 1041. The differential detection unit 1041 calculates a differential detection signal by time-synchronizing the I signal component and the Q signal component. The identification unit 1042 performs a determination on a complex plane on the differential detection signal detected by the differential detection unit 1041, performs de-mapping, and performs decoding. The identification unit 1042 sequentially outputs a signal obtained by decoding. A reference signal generated based on the synchronization pattern is stored in the reference synchronization pattern storage unit 1043 in advance as an expected value of the synchronization pattern. Specifically, a signal obtained by performing differential detection on the synchronization pattern is stored as the reference signal. The pattern synchronization unit 1044 performs position synchronization of a synchronization pattern code sequence sequentially output from the identification unit 1042 and the reference signal stored in the reference synchronization pattern storage unit 1043 to acquire synchronization position information.

Figure 27:
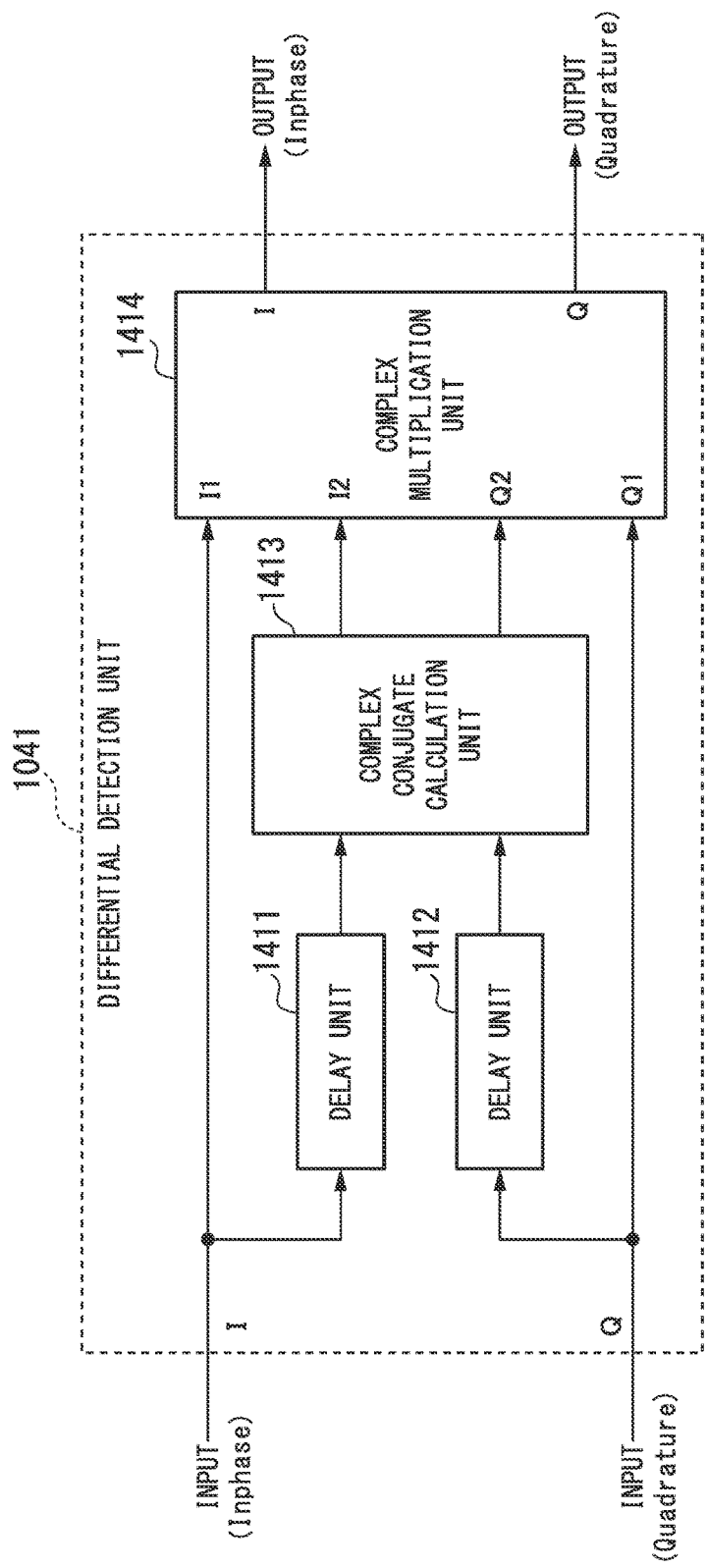
FIG. 27 is a block diagram illustrating an example of a configuration of a differential detection unit 1041 in the seventh embodiment.

FIG. 27 is a block diagram illustrating an example of a configuration of the differential detection unit 1041 in present embodiment. The differential detection unit 1041 includes delay units 1411 and 1412, a complex conjugate calculation unit 1413, and a complex multiplication unit 1414. An I signal component that is input to the differential detection unit 1041 is input to the delay unit 1411 and the complex multiplication unit 1414. The delay unit 1411 applies a delay of one symbol to the I signal component and outputs the I signal component to the complex conjugate calculation unit 1413. A Q signal component that is input to the differential detection unit 1041 is input to the delay unit 1412 and the complex multiplication unit 1414. The delay unit 1412 applies delay of one symbol to the Q signal component and outputs the Q signal component to the complex conjugate calculation unit 1413.

The complex conjugate calculation unit 1413 calculates a complex conjugate signal for a complex signal obtained by setting an input from the delay unit 1411 as an in-phase component and an input from the delay unit 1412 as a quadrature component. The complex conjugate calculation unit 1413 outputs the calculated complex conjugate signal to the complex multiplication unit 1414. The complex multiplication unit 1414 multiplies the complex signal including the I and Q signal components by the complex signal calculated by the complex conjugate calculation unit 1413, and outputs a multiplication result as a differential detection signal. The multiplication in the complex multiplication unit 1414 is expressed by Equation (9) below.

[Equation 9]

$$E_I(t) \cdot E_I(t-1)^* = |E_I(t)||E_I(t)|\exp(\theta_I(t))\exp(-\theta_I(t-1)) \quad (9)$$
$$= \exp(\theta_I(t) - \theta_I(t-1))$$

In Equation (9), $E_1(t)$ corresponds to a complex signal that is input from the outside to the complex multiplication unit 1414, and $E_1(t-1)^*$ corresponds to a complex signal input from the complex conjugate calculation unit 1413 to the complex multiplication unit 1414. When QPSK or BPSK is used as the synchronization pattern, an amplitude value $|E_1(t)|$ is always 1, and the output of the complex multiplication unit 1414 includes only a phase component. If the amplitude noise is generated due to transmission and the amplitude value deviates from 1, the output of the complex multiplication unit 1414 is divided by an amplitude value of the output and normalized, and thus only the phase information can be obtained.

Referring back to FIG. 26, the configuration of the synchronization pattern detection unit 1004A will continue to be described. Position synchronization between the synchronization pattern code sequence and the reference signal in the pattern synchronization unit 1044 is performed through an exclusive OR computation of the synchronization pattern code sequence that is output from the identification unit 1042 and the reference signal. If targets of the exclusive OR computation with the reference signal in the synchronization pattern code sequence output from the identification unit 1042 all match the reference signal, a computation result of the exclusive OR computation includes successive 0s having a length equal to the length of the synchronization pattern. It is to be noted that by providing an inversion circuit for any one of the synchronization pattern code sequence and the reference signal, 1s having a length equal to the length of the synchronization pattern can also be obtained when the targets of the exclusive OR computation with the reference signal match the reference signal. Further, the same can be realized even when the inversion circuit is provided for a result of the exclusive OR computation.

When the exclusive OR computation is used in the pattern synchronization unit 1044, synchronization can be established in the level of a result (1 bit) of a hard decision in the identification unit 1042, and thus it is possible to reduce the computational complexity and the circuit scale as compared to a case in which synchronization is established based on a result of a convolution computation using damplitude information.

Figure 28:
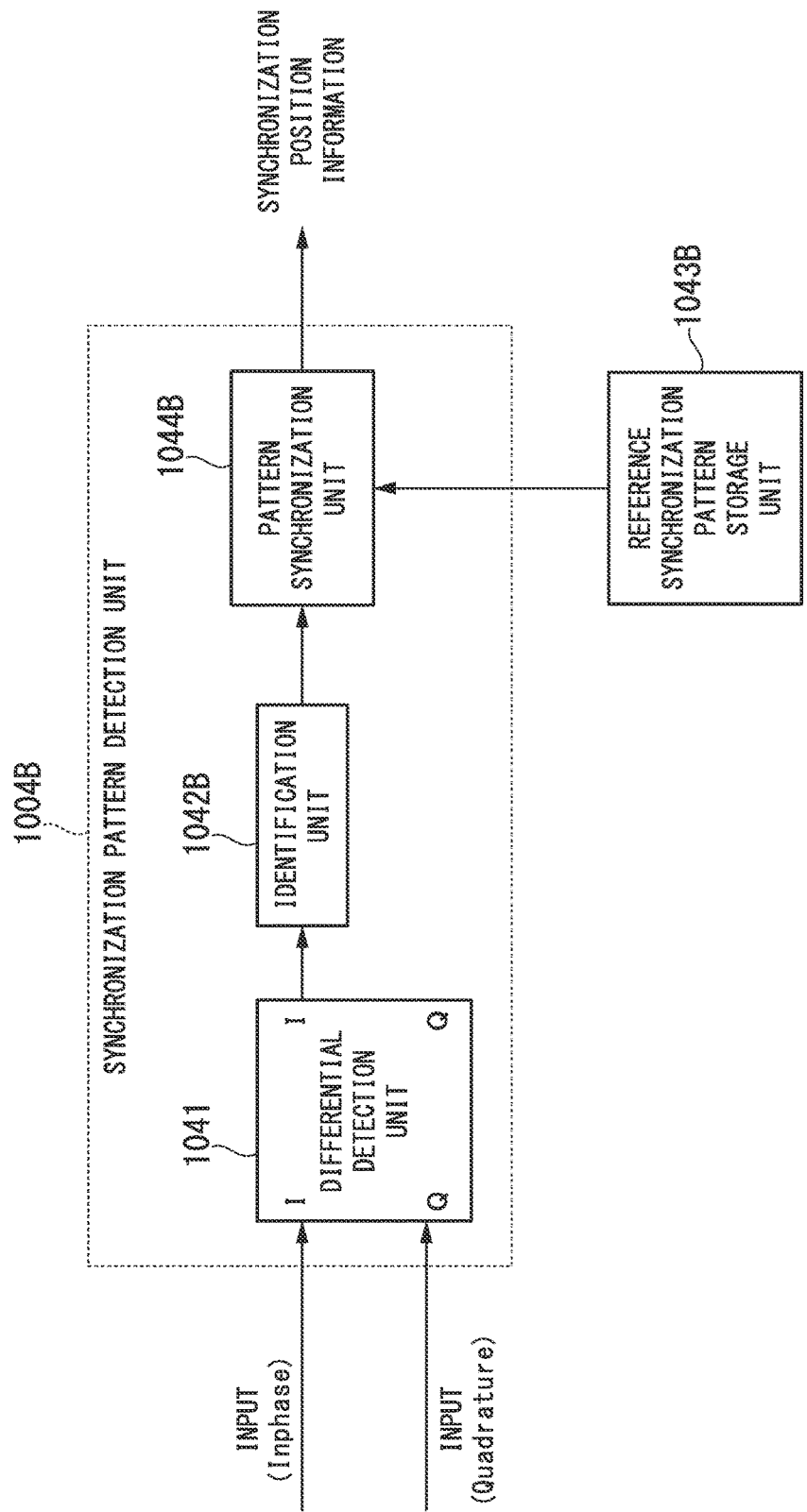
FIG. 28 is a block diagram illustrating an example of a configuration of a synchronization pattern synchronization unit 1004B in the seventh embodiment.

FIG. 28 is a block diagram illustrating an example of a configuration of the synchronization pattern detection unit 1004B that is a modification example of the synchronization pattern detection unit in present embodiment. The synchronization pattern detection unit 1004A illustrated in FIG. 26 describes a configuration when the modulation scheme in which one symbol includes information of two or more bits is used for the synchronization pattern. The synchronization pattern detection unit 1004B has a configuration when a modulation scheme in which one symbol includes information of one bit is used for the synchronization pattern. In this case, an example of the modulation scheme includes BPSK.

The synchronization pattern detection unit 1004B includes a differential detection unit 1041, an identification unit 1042B, and a pattern synchronization unit 1044B. Further, a reference synchronization pattern storage unit 1043B corresponding to the reference synchronization pattern storage unit 4411 illustrated in FIG. 6 is connected to the synchronization pattern detection unit 1004B. The differential detection unit 1041 has the same configuration as the differential detection unit 1041 illustrated in FIG. 26. An I signal component of a differential detection signal calculated by the differential detection unit 1041 is input to the identification unit 1042B. The identification unit 1042B performs a determination on a complex plane on the differential detection signal, performs de-mapping, and performs decoding. The identification unit 1042B sequentially outputs a signal obtained by decoding. A reference signal generated based on the synchronization pattern is stored in the reference synchronization pattern storage unit 1043B in advance as an expected value of the synchronization pattern. The pattern synchronization unit 1044B performs position synchronization of a synchronization pattern code sequence sequentially output from the identification unit 1042B and the reference signal stored in the reference synchronization pattern storage unit 1043B to acquire synchronization position information.

It is to be noted that while in FIG. 28, the I signal component output by the differential detection unit 1041 is input to the identification unit 1042B, the output of the identification unit 1042B always has the same value irrespective of whether the I signal component or the Q signal component is input when inversion is allowed, and thus any one of these may be input to the identification unit 1042B.

An advantage of using the configuration illustrated in FIG. 28 is that, since the output from the identification unit 1042B to the pattern synchronization unit 1044B is 1 bit, it is possible to reduce circuit scales of the pattern synchronization unit 1044B and the reference synchronization pattern storage unit 1043B.

Figure 29A:
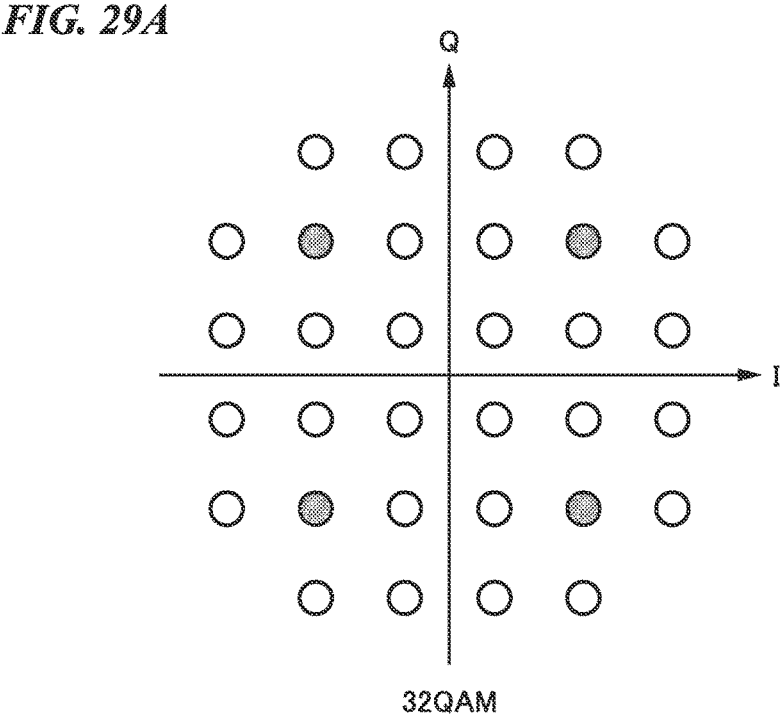
FIG. 29A is a diagram illustrating an example of mapping of a synchronization pattern when a data signal is modulated using 32QAM.
Figure 29B:
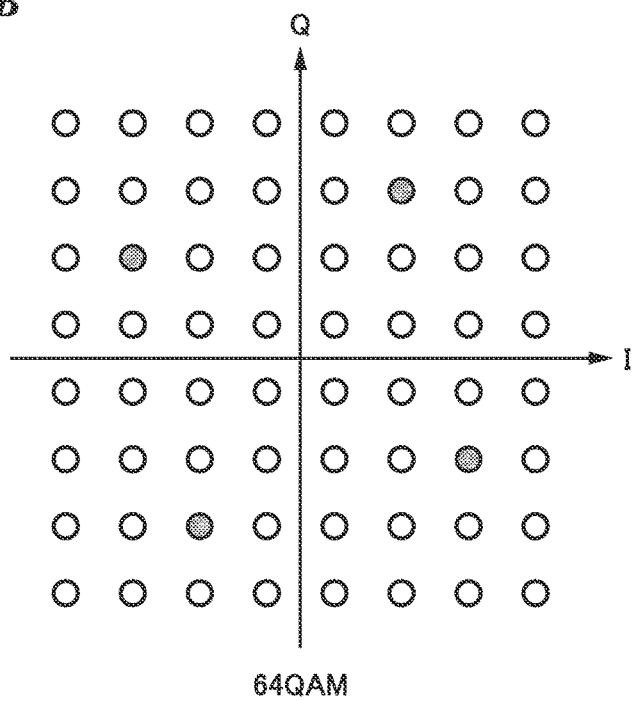
FIG. 29B is a diagram illustrating an example of mapping of a synchronization pattern when the data signal is modulated using 64QAM.

FIGS. 29A and 29B are diagrams illustrating examples of mapping of the synchronization pattern when the data signal has been modulated using 32QAM and 64QAM. In FIGS. 29A and 29B, symbols used for mapping of the synchronization pattern are filled with black. In FIGS. 29A and 29B, examples in which the synchronization pattern is mapped as the QPSK is illustrated. As illustrated in FIGS. 29A and 29B, symbols other than symbols having a maximum amplitude value and a minimum amplitude value are assigned to the synchronization pattern so that an error is not easily generated. This is because, in the symbol having the minimum amplitude value, an error is easily generated due to the influence of the noise, and in the symbol having the maximum amplitude value, an error is easily generated due to the influence of nonlinear optical effects. However, in an optical fiber transmission path in which the nonlinear optical effects are small, the symbols having the maximum amplitude value may be used. It is to be noted that the mappings illustrated in FIGS. 29A and 29B are examples, and mapping using symbols different from those in FIGS. 29A and 29B may be performed. Further, when the synchronization pattern is mapped as the BPSK, two symbols having a phase difference of 180° are selected from among the black symbols (•).

Once the time position of the synchronization pattern in the reception digital signal can be detected, since the synchronization pattern repeatedly arrives at periods of a symbol length of the transmission/reception frames, it is possible to improve detection sensitivity by averaging the synchronization positions of the frames.

Other processes can be performed similarly to those in the first embodiment to the sixth embodiment.

It is to be noted that the process (for example, phase compensation) of each unit may be performed by recording a program for realizing the function of each of the units (for example, the phase noise compensation unit) in the above embodiments on a computer-readable recording medium, loading the program recorded in the recording medium to a computer system, and executing the program. It is to be noted that the "computer system" referred to herein includes an operating system (OS) and hardware such as a peripheral device. Further, the "computer system" also includes a World Wide Web (WWW) system including a homepage providing environment (or display environment). Further, the "computer-readable recording medium" includes a portable medium such as a flexible disk, a magnetic optical disc, a read only memory (ROM), a compact disc (CD)-ROM, or a storage device such as a hard disk built in the computer system. Further, the "computer-readable recording medium" also includes a recording medium that holds a program for a constant time, such as a volatile memory (random access memory (RAM)) inside a computer system serving as a server or a client when the program is transmitted via a network such as the Internet or a communication line such as a telephone line.

Further, the above program may be transmitted from a computer system in which the program is stored in a storage device or the like to other computer systems via a transmission medium or by transmission waves in the transmission medium. Here, the "transmission medium" for transmitting the program refers to a medium having a function of transmitting information, such as a network (communication network) like the Internet or a communication circuit (communication line) like a telephone circuit. Also, the above program may be a program for realizing part of the above-described functions. Further, the program may be a program capable of realizing the above-described functions in combination with a program previously stored in a computer system, i.e., a differential file (a differential program).

While the embodiments of the present invention have been described above with reference to the drawings, a specific configuration is not limited to these embodiments, and for example, designs (additions, omissions, substitutions, and other modifications of the structure) that do not depart from the gist of the present invention are also included. The present invention is not limited by the foregoing description, but is limited by only the appended claims.

INDUSTRIAL APPLICABILITY

The present invention is applicable to, for example, an optical transmission system. In accordance with the present invention, it is possible to acquire the phase variation in the received complex electric field signal and perform phase compensation without calculation of the phase angle for the signal between the pilot symbols and a continuity process for the phase variation, and thus it is possible to reduce the computational complexity and the circuit scale.

DESCRIPTION OF REFERENCE SIGNS

1 Transmission apparatus
2 Optical fiber transmission path
3 Reception apparatus
4 Digital signal processing unit
11 Signal light source
12 Modulation signal generation unit
13 Optical modulator
31 Local oscillation light source
32 Polarization-division multiplexing optical hybrid
33a, 33b, 33c, 33d Balance detector
34a, 34b, 34c, 34d Analog-to-digital converter
41 Chromatic dispersion compensation unit
42 Adaptive equalizer
43 Frequency offset compensation unit
44 Phase noise compensation unit
45 Carrier phase synchronization unit
46 Symbol identification unit
121 Pilot symbol insertion unit
122 Synchronization pattern insertion unit
123 Symbol mapping unit
441 Pilot symbol detection unit
442 Reference pilot symbol storage unit
443 Error signal operation unit
444, 644, 744, 844 Compensation electric field signal generation unit
445 Phase compensation unit
1004A, 1004B Synchronization pattern detection unit
1041 Differential detection unit
1042, 1042B Identification unit
1043, 1043B Reference synchronization pattern storage unit
1044, 1044B Pattern synchronization unit
1411, 1412 Delay unit
1413 Complex conjugate calculation unit
1414 Complex multiplication unit
4411 Reference synchronization pattern storage unit
4412 Synchronization pattern detection unit
4413, 4414 Pilot symbol extraction unit 4441, 7441, 8441 First amplitude normalization unit
4442, 5442, 6442, 7442, 8442 Interpolation processing unit
4443 Complex electric field Interpolation unit
4444, 5443, 7443, 8443, 8510, 9510 Low pass filter
4445, 7445, 8445 Second amplitude normalization unit
5444, 9500 Linear interpolation processing unit
6441 Phase difference computation unit
6443, 8540, 9540 Phase-to-electric field conversion unit
6445, 8501, 8532, 9501, 9532 Delayer
6446 Subtractor
6447 Phase difference calculator
6448, 8531, 9531 Adder
7444, 8444 First linear interpolation processing unit
7446, 8446 Second linear interpolation processing unit
8447, 9447 Residual frequency offset estimation unit
8448, 8502, 9502 Complex conjugate computation unit
8449, 8450, 8451, 8452, 8503, 8504, 9503, 9504 Multiplier
8500, 9500 Slope detection unit
8520, 9520 Electric field-to-phase conversion unit
8530, 9530 Integration unit
9550 Coefficient setting unit

The invention claimed is:

1. An optical transmission system comprising:
a pilot symbol detection unit which detects a plurality of pilot symbols intermittently inserted into a received complex electric field signal that is obtained through coherent detection for a received optical signal;
an error signal computation unit which calculates a complex electric field error signal indicating a phase variation at each pilot symbol based on the pilot symbols detected by the pilot symbol detection unit and a predetermined reference symbol;
a compensation electric field signal generation unit which estimates the phase variation between the pilot symbols in the received complex electric field signal using filter processing based on the complex electric field error signal calculated by the error signal computation unit; and
a phase noise compensation unit which performs phase compensation for the received complex electric field signal based on the phase variation between the pilot symbols estimated by the compensation electric field signal generation unit,
wherein the compensation electric field signal generation unit comprises a low pass filter, a cut-off frequency of the low pass filter is determined based on an interval at which the pilot symbols are located, and the low pass filter is used when the phase variation is estimated.

2. The optical transmission system according to claim 1, wherein the compensation electric field signal generation unit comprises a complex electric field interpolation unit which outputs a signal sequence in which a signal sequence having a length corresponding to a symbol section between the pilot symbols in the received complex electric field signal is interpolated between complex electric field error signal, and
the low pass filter receives the signal sequence output from the complex electric field interpolation unit.

3. The optical transmission system according to claim 2, wherein the complex electric field interpolation unit interpolates the complex electric field error signal or a signal sequence of a complex signal having an amplitude of zero.

4. The optical transmission system according to claim 1, wherein the compensation electric field signal generation unit comprises a linear interpolation processing unit which calculates the phase variation in a symbol section between the pilot symbols in the received complex electric field signal through linear interpolation of an output of the low pass filter which receives an input of the complex electric field error signal.

5. The optical transmission system according to claim 4, wherein the compensation electric field signal generation unit further comprises at least a second amplitude normalization unit among
a first amplitude normalization unit which normalizes an amplitude of the complex electric field error signal calculated by the error signal computation unit, and
the second amplitude normalization unit which normalizes an amplitude of a complex signal indicating the phase variation.

6. The optical transmission system according to claim 1, wherein the compensation electric field signal generation unit comprises:
a phase difference computation unit which calculates phase signals indicating phases of complex electric field error signals;
an interpolation unit which generates a signal sequence in which a complex electric field signal sequence having a length corresponding to a symbol section between the pilot symbols in the received complex electric field signal is inserted between the phase signals calculated by the phase difference computation unit; and
a phase-to-electric field conversion unit which calculates a phase variation in the symbol section between the pilot symbols in the received complex electric field signal by converting an output of the low pass filter which receives the signal sequence generated by the interpolation unit into a complex signal.

7. The optical transmission system according to claim 6, wherein the interpolation unit interpolates the phase signals or a signal sequence of zero.

8. The optical transmission system according to claim 1, wherein the compensation electric field signal generation unit comprises:
a phase difference computation unit which calculates a phase signal indicating a phase of the complex electric field error signal;
a linear interpolation processing unit which calculates a phase in a symbol section between the pilot symbols in the received complex electric field signal through linear interpolation for an output of the low pass filter which receives the phase signal calculated by the phase difference computation unit; and
a phase-to-electric field conversion unit which calculates a phase variation in the symbol section between the pilot symbols in the received complex electric field signal by converting the phase calculated by the linear interpolation processing unit into a complex signal.

9. The optical transmission system according to claim 1, wherein the pilot symbol detection unit comprises:
a synchronization pattern detection unit which receives a transmission frame, the transmission frame including a synchronization pattern including consecutive symbols, the pilot symbols inserted into transmission data at intervals of a predetermined number of symbols relative to the synchronization pattern, and the transmission data, and detects a position of the synchronization pattern; and
a pilot symbol extraction unit which detects positions of the pilot symbols from the detected position of the synchronization pattern and extracts the pilot symbols.

10. The optical transmission system according to claim 9, wherein a pseudo random bit sequence is used as the synchronization pattern.

11. The optical transmission system according to claim 9, wherein when there is an amplitude level having three or more values in modulation for the synchronization pattern, a symbol having an amplitude level other than a maximum amplitude level and a minimum amplitude level is assigned to the synchronization pattern.

12. The optical transmission system according to claim 9, wherein the synchronization pattern is assigned to two symbols having a phase difference of 180° in modulation for the synchronization pattern.

13. The optical transmission system according to claim 9, wherein the synchronization pattern detection unit detects the synchronization pattern included in the received complex electric field signal based on a hard decision result for a differential detection signal obtained by performing differential detection on the received complex electric field signal.

14. An optical transmission system comprising:
a pilot symbol detection unit which detects a plurality of pilot symbols intermittently inserted into a received complex electric field signal that is obtained through coherent detection for a received optical signal;
an error signal computation unit which calculates a complex electric field error signal indicating a phase variation at each pilot symbol based on the pilot symbols detected by the pilot symbol detection unit and a predetermined reference symbol;
a compensation electric field signal generation unit which estimates the phase variation between the pilot symbols in the received complex electric field signal using filter processing based on the complex electric field error signal calculated by the error signal computation unit; and
a phase noise compensation unit which performs phase compensation for the received complex electric field signal based on the phase variation between the pilot symbols estimated by the compensation electric field signal generation unit, wherein the compensation electric field signal generation unit comprises:
a low pass filter which receives the complex electric field error signal;
a first linear interpolation processing unit which divides a section of a symbol interval of an output of the low pass filter into a predetermined number of symbol sections and calculates a phase variation of a boundary point between the divided symbol sections excluding the output of the low pass filter based on the output of the low pass filter through linear interpolation;
an amplitude normalization unit which normalizes an amplitude of a complex signal indicating the phase variation of the boundary point including the output of the low pass filter; and
a second linear interpolation processing unit which calculates a phase variation in the divided symbol sections based on the phase variation of the boundary point after normalization through linear interpolation.

15. An optical transmission system comprising:
a pilot symbol detection unit which detects a plurality of pilot symbols intermittently inserted into a received complex electric field signal that is obtained through coherent detection for a received optical signal;
an error signal computation unit which calculates a complex electric field error signal indicating a phase variation at each pilot symbol based on the pilot symbols detected by the pilot symbol detection unit and a predetermined reference symbol;
a compensation electric field signal generation unit which estimates the phase variation between the pilot symbols in the received complex electric field signal using filter processing based on the complex electric field error signal calculated by the error signal computation unit; and
a phase noise compensation unit which performs phase compensation for the received complex electric field signal based on the phase variation between the pilot symbols estimated by the compensation electric field signal generation unit, wherein the compensation electric field signal generation unit comprises:
a residual frequency offset estimation unit which receives an input of the complex electric field error signal;
a first low pass filter which receives an input of the complex electric field error signal; and
a computation unit which multiplies an input and an output of the first low pass filter by an output of the residual frequency offset estimation unit, and
the residual frequency offset estimation unit comprises:
a phase slope detection unit which calculates an instantaneous value of a residual frequency offset based on the complex electric field error signal;
a second low pass filter which averages output values of the phase slope detection unit;
an electric field-to-phase conversion unit which converts a complex electric field value output from the second low pass filter to a phase value;
an integration unit which integrates the phase value output from the electric field-to-phase conversion unit; and
a phase-to-electric field conversion unit which converts an integration value output from the integration unit into a complex electric field value as a phase value.

16. The optical transmission system according to claim 15, wherein the residual frequency offset estimation unit comprises a coefficient setting unit which multiplies an output of the electric field-to-phase conversion unit by a coefficient in accordance with an interval between the pilot symbols.

* * * * *